(12) United States Patent
Ashkenazi et al.

(10) Patent No.: US 10,488,660 B2
(45) Date of Patent: *Nov. 26, 2019

(54) WEARABLE OPTICAL DISPLAY SYSTEM FOR UNOBSTRUCTED VIEWING

(71) Applicant: EVERYSIGHT LTD., Haifa (IL)

(72) Inventors: Asaf Ashkenazi, Zichron Yaakov (IL); Hanan Shamir, Binyamina (IL)

(73) Assignee: Everysight Ltd., Haifa (IL)

( * ) Notice: Subject to any disclaimer, the term of this patent is extended or adjusted under 35 U.S.C. 154(b) by 1014 days.

This patent is subject to a terminal disclaimer.

(21) Appl. No.: 14/632,310

(22) Filed: Feb. 26, 2015

(65) Prior Publication Data
US 2015/0168730 A1    Jun. 18, 2015

Related U.S. Application Data

(63) Continuation-in-part of application No. 12/862,987, filed on Aug. 25, 2010, now Pat. No. 8,970,962, which is a continuation of application No. 12/404,087, filed on Mar. 13, 2009, now Pat. No. 7,791,809.

(Continued)

(51) Int. Cl.
*G02B 27/01* (2006.01)

(52) U.S. Cl.
CPC ..... *G02B 27/0172* (2013.01); *G02B 27/0176* (2013.01); *G02B 2027/011* (2013.01); *G02B 2027/014* (2013.01); *G02B 2027/0123* (2013.01); *G02B 2027/0132* (2013.01); *G02B 2027/0156* (2013.01); *G02B 2027/0178* (2013.01)

(58) Field of Classification Search
CPC .............. G02B 27/0172; G02B 27/0176
USPC ................................. 359/630-633
See application file for complete search history.

(56) References Cited

U.S. PATENT DOCUMENTS 4,000,419 A    12/1976  Crost et al.
4,266,848 A     5/1981  Schlegel
(Continued)

FOREIGN PATENT DOCUMENTS

CN    1894617    1/2007
CN    1957284    5/2007
(Continued)

*Primary Examiner* — James R Greece
(74) *Attorney, Agent, or Firm* — Conley Rose, P.C.

(57) ABSTRACT

A user wearable optical display system comprising a user attachable section for detachably mounting said user wearable optical display system to a head of a user; a partially transmissive partially reflective lens, coupled with said user attachable section, and configured to be facing at least one eye of said user; and an electro-optical unit coupled with at least one of said user attachable section and said partially transmissive partially reflective lens, said electro-optical unit comprising: a processor; and a light projection unit coupled with said processor, said light projection unit is configured to transmit light beams onto said partially transmissive partially reflective lens; wherein said electro-optical unit is configured to be positioned with respect to said user attachable section such that when said user wearable optical display system is mounted on said user, said electro-optical unit is located at the glabellar region of said user.

42 Claims, 17 Drawing Sheets

Related U.S. Application Data

(60) Provisional application No. 61/036,281, filed on Mar. 13, 2008.

(56) References Cited

U.S. PATENT DOCUMENTS

| | | | |
|---|---|---|---|
| 4,468,101 A | 8/1984 | Ellis | |
| 4,653,879 A | 3/1987 | Filipovich | |
| 4,689,834 A | 9/1987 | McCarthy et al. | |
| 4,775,217 A | 10/1988 | Ellis | |
| 4,915,487 A | 4/1990 | Riddell, III et al. | |
| 5,079,416 A | 1/1992 | Filipovich | |
| 5,229,598 A | 7/1993 | Filipovich | |
| 5,341,242 A | 8/1994 | Gilboa et al. | |
| 5,416,876 A * | 5/1995 | Ansley | G02B 6/06 345/8 |
| 5,506,728 A | 4/1996 | Edwards et al. | |
| 5,539,422 A * | 7/1996 | Heacock | G02B 27/0172 345/8 |
| 5,654,828 A * | 8/1997 | Togino | G02B 25/001 359/631 |
| 5,712,726 A | 1/1998 | Espie et al. | |
| 5,978,144 A | 11/1999 | Li et al. | |
| 6,043,882 A | 3/2000 | De Wolf et al. | |
| 6,137,636 A | 10/2000 | Smith | |
| 6,198,090 B1 | 3/2001 | Iosue | |
| 6,201,641 B1 | 3/2001 | Filipovich | |
| 6,282,849 B1 | 9/2001 | Tuczek | |
| 6,342,872 B1 | 1/2002 | Potin et al. | |
| 6,560,029 B1 | 5/2003 | Dobbie et al. | |
| 6,747,802 B2 | 6/2004 | Bignolles et al. | |
| 6,765,729 B2 | 7/2004 | Perrin et al. | |
| 2004/0156114 A1 | 8/2004 | Sayed et al. | |
| 2006/0250574 A1 | 11/2006 | Grand et al. | |
| 2009/0231722 A1 | 9/2009 | Filipovich et al. | |
| 2010/0164840 A1 | 7/2010 | Yamamoto | |
| 2013/0044042 A1 | 2/2013 | Olsson et al. | |
| 2014/0327971 A1 | 11/2014 | Filipovich et al. | |

FOREIGN PATENT DOCUMENTS

| | | |
|---|---|---|
| CN | 1967309 | 5/2007 |
| DE | 19724141 | 12/1998 |
| EP | 1300716 A1 | 4/2003 |
| EP | 2106132 A1 | 9/2009 |
| GB | 2361573 | 10/2001 |
| JP | 2001-117045 | 4/2001 |
| JP | 2002107655 | 4/2002 |
| JP | 2003-43409 | 2/2003 |
| KR | 20040050008 | 6/2004 |
| WO | 9745760 | 12/1997 |
| WO | 2005062105 | 7/2005 |

\* cited by examiner

WEARABLE OPTICAL DISPLAY SYSTEM FOR UNOBSTRUCTED VIEWING

REFERENCE TO RELATED APPLICATIONS

This application is a continuation in part of and claims priority to U.S. application Ser. No. 12/862,987, titled "Visor Heads-Up Display" and filed Aug. 25, 2010, allowed, which claims priority to U.S. application Ser. No. 12/404,087, titled "Visor Heads-Up Display" and filed Mar. 13, 2009, issued as U.S. Pat. No. 7,791,809, which claims priority to U.S. Provisional Application No. 61/036,281, titled "Visor Heads-Up Display" and filed Mar. 13, 2008. This application claims priority to all of those prior applications, and incorporates herein the disclosures thereof by reference.

FIELD OF THE DISCLOSED TECHNIQUE

The disclosed technique relates to optical systems in general, and to wearable optical display systems, in particular.

BACKGROUND OF THE DISCLOSED TECHNIQUE

Head-worn optical instruments and devices such as glasses and sunglasses (i.e., eyewear) that incorporate electronic devices are generally known in the art. Examples of such devices include head-mounted displays (HMDs), also known as helmet mounted displays, which are worn on a head of a user and include an image source such as an electronic display that produces an image intended for being directed toward one eye (in the monocular case) or both eyes (in the binocular case) of that user. Another type of a head-worn device is an optical head-mounted display (OHMD), which is a see-through HMD (also known as an "optical see-though HMD") that allows the user to both view through it, as well as to view generated images on it.

An example prior art device is disclosed in U.S. Patent Application Publication No.: US 2013/0044042 A1 to Olsson et al., assigned to Google Inc., entitled "Wearable Device with Input and Output Structures", and directed at a head-mounted device for receiving user input and presenting information on its display. The head-mounted device includes a frame, two lens elements, a transparent display, an on-board computing system, a first projector, a second projector, a video camera, a sensor, and a finger-operable touch pad. The frame includes a center frame support, a plurality of lens elements, a center frame support, extending side arms. The extending side arms are configured to secure the head-mounted device to a face, nose, and ears of a user. The on-board computing system, the video camera, the sensor and the finger-operable touch pad are generally positioned on one of the extending side arms. The video camera is configured to capture images. The sensor includes a gyroscope or an accelerometer. The finger-operable touch pad receives user input by sensing finger movements of the user. The first projector is coupled to an inside surface of one of the extending side-arms and configured to project a display onto an inside surface of one of the lens elements. Similarly, the second projector is coupled to an inside surface of the other extending side-arms and configured to project onto an inside surface of the other lens elements. The lens elements act as combiners. Other embodiments include a single lens element that is coupled to one of the extending side arms or the center frame support. The single lens element includes a display that overlays computer-generated graphics upon the user's view. The on-board computing system is configured to receive and to analyze data from the video camera and the finger-operable touch pad and to generate images for output by the lens elements.

SUMMARY OF THE PRESENT DISCLOSED TECHNIQUE

It is an object of the disclosed technique to provide a novel user wearable optical display system that provides information in the form of projected light to a user who wears the system without obstructing the user's field of regard (FOR). In accordance with the disclosed technique, there is thus provided a user wearable optical display system that includes a user attachment section, a partially transmissive partially reflective lens, and an electro-optical unit. The user attachment section is for detachably mounting the user wearable optical display system to a head of a user. The partially transmissive partially reflective lens, which is coupled with the user attachment section, is configured to be facing at least one eye of the user. The electro-optical unit is coupled with at least one of the user attachment section and the partially transmissive partially reflective lens. The electro-optical unit includes a processor, and a light projection unit. The processor is coupled with the light projection unit. The light projection unit is configured to transmit light beams onto the partially transmissive partially reflective lens. The electro-optical unit is configured to be positioned with respect to the user attachment section such that when the user wearable optical display system is mounted on the user, the electro-optical unit is located at the glabellar region of the user.

In accordance with another embodiment of the disclosed technique there is provided an optical display system configured for attachment to a user wearable optical device. The user wearable optical device includes a user attachment section, and a partially transmissive partially reflective lens. The optical display system includes an electro-optical unit, and at least one coupler. The partially transmissive partially reflective lens is coupled with the user attachment section. The user attachment section is configured for detachably mounting the user wearable optical device to a head of a user. The partially transmissive partially reflective lens is configured to be facing at least one eye of the user. The electro-optical unit includes a processor, and a light projection unit. The processor is coupled with the light projection unit. The light projection unit is configured to transmit light beams onto the partially transmissive partially reflective lens. The at least one coupler is configured to couple the electro-optical unit with at least one of the user attachment section and the partially transmissive partially reflective lens. The electro-optical unit is configurable to be positioned with respect to the user attachment section such that when the user wearable optical device is mounted on the user, the electro-optical unit is located at the glabellar region of the user.

In accordance with a further embodiment of the disclosed technique there is provided an optical display system configured for attachment to a user wearable optical device. The user wearable optical device includes a user attachment section that is configured for detachably mounting the user wearable optical device to a head of a user. The optical display system includes an electro-optical unit, a partially transmissive partially reflective lens, and at least one coupler. The electro-optical unit includes a processor, a light projection unit, and at least one coupler. The processor is coupled with the light projection unit. The light projection unit is configured to transmit light beams onto the partially transmissive partially reflective lens. The partially transmissive partially reflective lens is coupled with the electro-optical unit. The partially transmissive partially reflective lens is configured to be facing at least one eye of the user. The at least one coupler is configured to couple the electro-optical unit and the partially transmissive partially reflective lens with the user attachment section. The electro-optical unit is configurable to be positioned with respect to the user attachment section such that when the user wearable optical display system is mounted on the user, the electro-optical unit is located at the glabellar region of the user.

In accordance with another embodiment of the disclosed technique there is provided an optical display system for presenting an image to a user. The optical display system includes a partially transmissive partially reflective lens, and an electro-optical sub-system. The partially transmissive partially reflective lens is configured to be facing at least one eye of the user. The electro-optical sub-system is configured to have a fixed position with respect to the partially transmissive partially reflective lens. The electro-optical sub-system includes an image generator, a first lens, a second lens, a third lens, a fourth lens, and a curved mirror. The image generator is configured to generate and irradiate light beams so as to form the image. The image generator, the first lens, the second lens, the third lens, the fourth lens, and the curved mirror are in fixed positions with respect to each other, so as to allow the image to travel an optical path through the first lens, then through the second lens, then to reflect from the curved mirror and pass again through the second lens and through the first lens, then toward the third lens, then through the fourth lens, and then to reflect from the partially transmissive partially reflective lens toward the at least one eye of the user.

BRIEF DESCRIPTION OF THE DRAWINGS

The disclosed technique will be understood and appreciated more fully from the following detailed description taken in conjunction with the drawings in which.

DETAILED DESCRIPTION OF THE EMBODIMENTS

Figure 1:
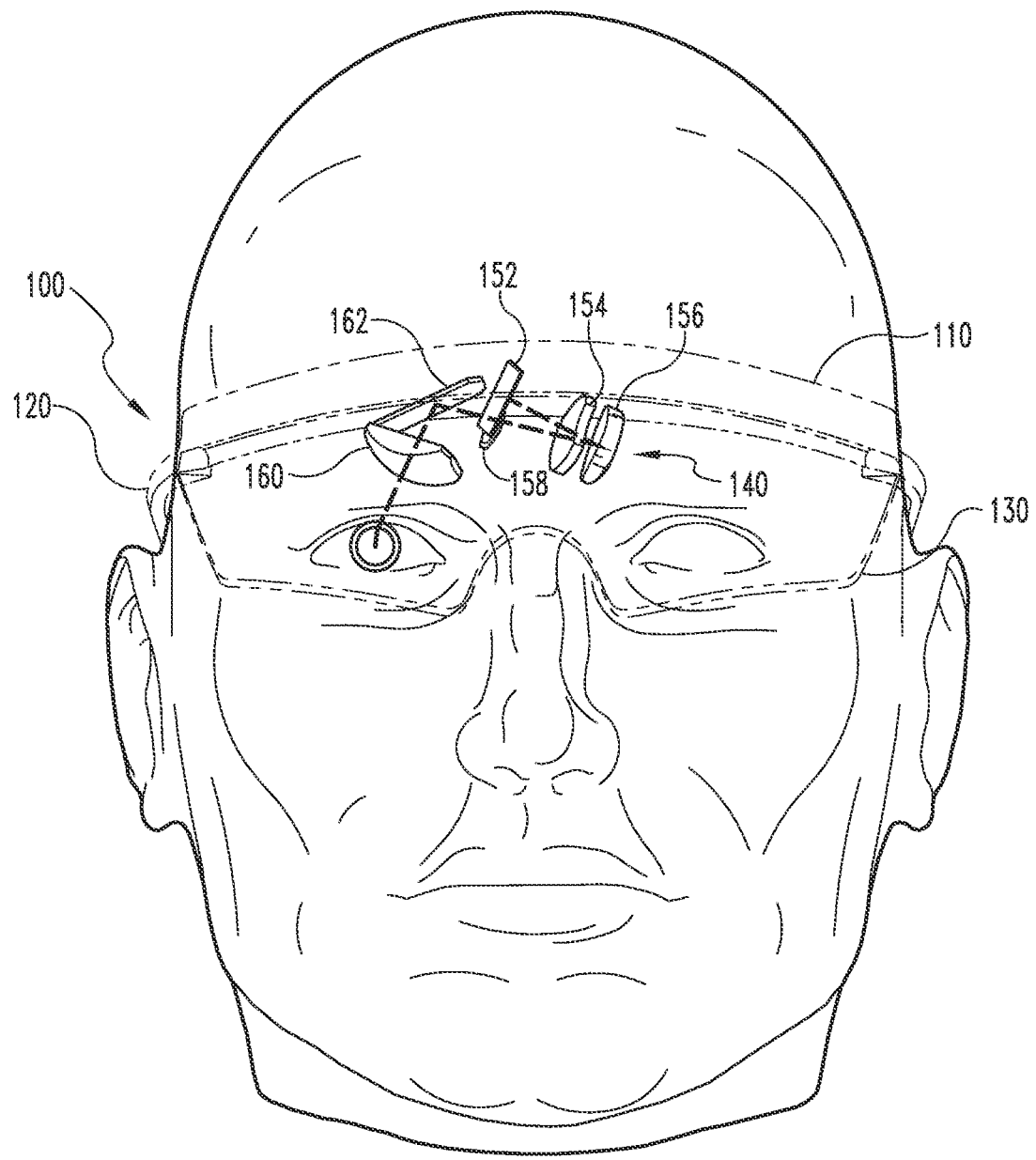
FIG. 1 is a schematic illustration in a front view of monocular head-up display (HUD) glasses according to a first embodiment.

The disclosed technique overcomes the disadvantages of the prior art by providing a user wearable optical display system that provides information in the form of projected light (e.g., an image) to a user who wears the system without obstructing the user's field of regard (FOR). The FOR may generally be defined as all of the points of the physical environment that can be perceived by a stable eye of the user at a given moment. The user wearable optical display system includes a user attachment section (such as a frame, glasses, straps, etc.), a partially transmissive partially reflective lens (generally see-through), and an electro-optical unit (also denoted as electro-optical sub-system). The user attachment section is constructed, configured and operative for detachably mounting the user wearable optical display system to a head of the user. The partially transmissive partially reflective lens is coupled with the user attachment section, and configured to be facing at least one eye of the user. The electro-optical unit is coupled with at least one of user attachment section and partially transmissive partially reflective lens. The electro-optical unit includes a processor, and a light projection unit, coupled with the processor. The light projection unit is constructed, configured and operative to transmit light beams onto the partially transmissive partially reflective lens. The electro-optical unit is configured and positioned with respect to the user attachment section such that when the user wearable optical display system is mounted on (worn by) the user, the electro-optical unit is located at the glabellar region of the user. The glabellar region is defined herein as an area covering the glabella, which, in humans, is an anatomical area between the eyebrows and above the nose. In such a relative configuration of the electro-optical unit and user attachment section (e.g., frame), the user wearable optical display system provides the user with both an unobstructed viewing capability of the visual environment within the user's FOR as well as simultaneously enabling data to be presented (e.g., in the form of light encoded data, e.g., images, symbol data, text, graphics, etc.) within that FOR.

The user wearable optical display system, which is constructed in compact form such to be accommodated substantially in the glabellar region of the user (when worn), as well as being generally light-weight, provides near-eye presentation (e.g., projection) of light encoded data, or interchangeably, light encoded information (i.e., light that is encoded with data or light possessing information) to the user. The partially transmissive partially reflective lens, allows the generated light encoded data to at least partially reflect off its surface toward the eye(s) of the user, while concurrently allowing at least partial transmission therethrough of incoming light from the surrounding or forward-facing physical environment viewed by the user. Effectively, the partially transmissive partially reflective lens is configured, constructed and operative as an optical combiner that enables the light encoded data to be superimposed (overlaid) with a viewed scene of the physical environment. The superimposition may be aligned coaxially with the user's line-of-sight, anywhere in the user's FOR. According to one presentation, the light encoded data is projected such that it is presented at the center of the user's FOR. Alternatively, the light encoded data is presented at other positions of the user's FOR (e.g., right side, upper side, etc.). Contrast to prior art user wearable devices that house, incorporate, and/or dispose a substantial portion (a bulk) of the operational (functional) elements of their system in or along a frame structure of the user wearable device, the disclosed technique provides a user wearable optical display system that employs a different approach in which the bulk of the main functional elements (e.g., optical elements, lenses, and electronics) is positioned at the glabellar region of the user who wears the user wearable optical display system. Other prior art devices position various functional elements (apart from the see-through lens itself), such as near-eye displays, in front of the eyes of the user, such that they at least partially (or even totally) obstruct or limit the user's inherent FOR. In prior art systems that position optical elements such as semi-transparent folding mirrors, beam splitters, near-eye displays, and the like in front of the eye(s) of the user, may fail to meet safety regulations and standards for eyewear. The user wearable optical display system of the disclosed technique employs shatter resistant materials in the construction and/or manufacture of partially transmissive partially reflective lens such that it exhibits shatterproof and impact-resistant qualities, and further complies with safety standards for eyewear in general, and eyewear (e.g., sunglasses) used for sporting applications, in particular. In addition, the partially transmissive partially reflective lens constructed, and optically designed to be thin (e.g., approximately between 0.8-2.5 millimeters in thickness) so as to reduce distortion effects such as prismatic deviations, as well as to reduce weight.

The disclosed technique is generally applicable to a variety of uses and users and particularly applicable in cases where visual information is required during active situations (e.g., "on-the-go", "on-the-move") where the eyes of the user remain attentive to dynamic physical environments (although applicability during physically inactive situations, such as reading is also viable). The applicability of the disclosed technique may be appreciated for example, in the realm of sports (e.g., cycling, motorcycling, motor-racing, skiing, sky diving, etc.) where there is typically a rapidly changing dynamic environment in which any obscurations to a user's FOR cannot be compromised, as it may become a safety issue. The disclosed technique is not particularly limited to a definite realm, as it may likewise find applicability in diverse realms or fields, such as for military applications (e.g., during combat situations), during maneuvering, handling, directing, operating, or driving of a vehicle, during the piloting of an aircraft or other vessel (e.g., ship), during the validation of manufactured products in a factory, in computer gaming, and the like.

Heads-up displays or head-up displays (HUDs) designed for military use may fail to meet specifications desirable or essential for civilian use. For example, the bulk, weight, and expense associated with many military HUDs may prevent those designs from penetrating into civilian and especially entertainment markets.

The present invention provides a HUD system designed to be generally smaller and lighter than other prior art designs. Various embodiments fit normal-sized glasses, provide enhanced images, produce a field-of-view up to 35 degrees (diagonal), and interface with many portable electronic devices.

Figure 2:
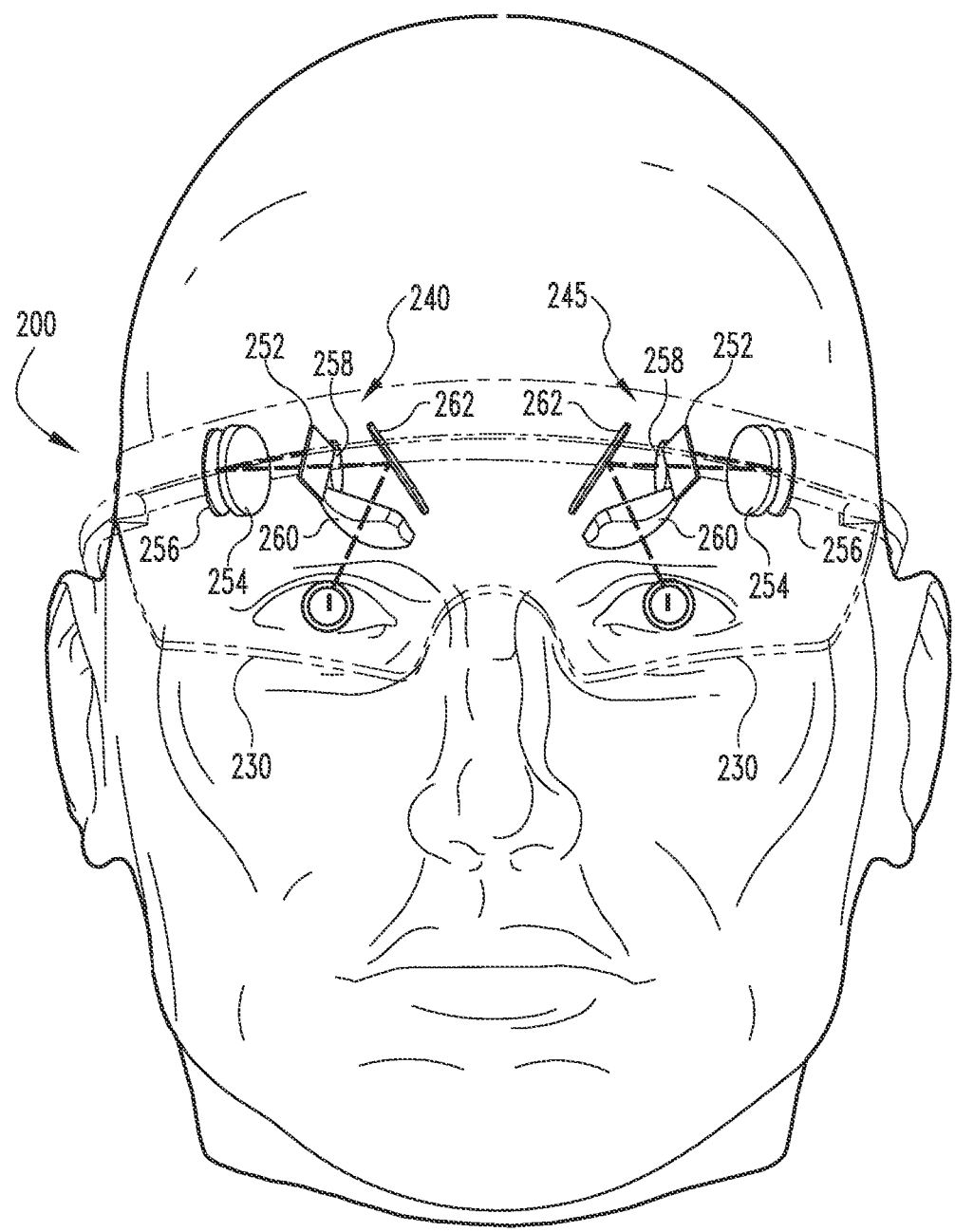
FIG. 2 is a schematic illustration in a front view of binocular HUD glasses, according to a second embodiment.

Generally, a visor heads-up display according to some embodiments disclosed herein is illustrated in FIG. 1, while another is shown in FIG. 2. These visor embodiments are in the form of wrap-around glasses, though helmet-based forms, mirror-based forms, and other forms may be employed. The term "visor" used herein refers to an object that is within the view of a wearer, which is partially transmissive to light and as well as partially reflective to light (e.g., off which the generated image(s) reflect(s)). For example, the visor may be a lens with partially reflecting characteristics, a mirror, or other (at least partially reflective) object, whether or not the word "visor" would typically be used to describe it.

Turning to FIG. 1, monocular HUD glasses 100 includes a frame 110, at least two stems 120, and a visor 130. Optical system 140 generates an image visible to at least one eye of the wearer of HUD glasses 100 on the surface of visor 130. In various embodiments, this image includes data, images relevant to the user, data related to the user's activities. In some embodiments, the image relates to a game, e-mail or movie images, while in other embodiments the image includes user-related physiological data (such as heart rate, blood pressure, or other data), driving and navigation data, and the like.

A second embodiment shown in FIG. 2 illustrates binocular HUD glasses that include a pair of optical systems 240 and 245; each optical system provides an image to at least one of the user's eyes. In addition to the displays discussed above in connection with FIG. 1, in various embodiments, these optical systems are operative to display data, images, stereoscopic images, 3-D images, and the like.

Figure 3:
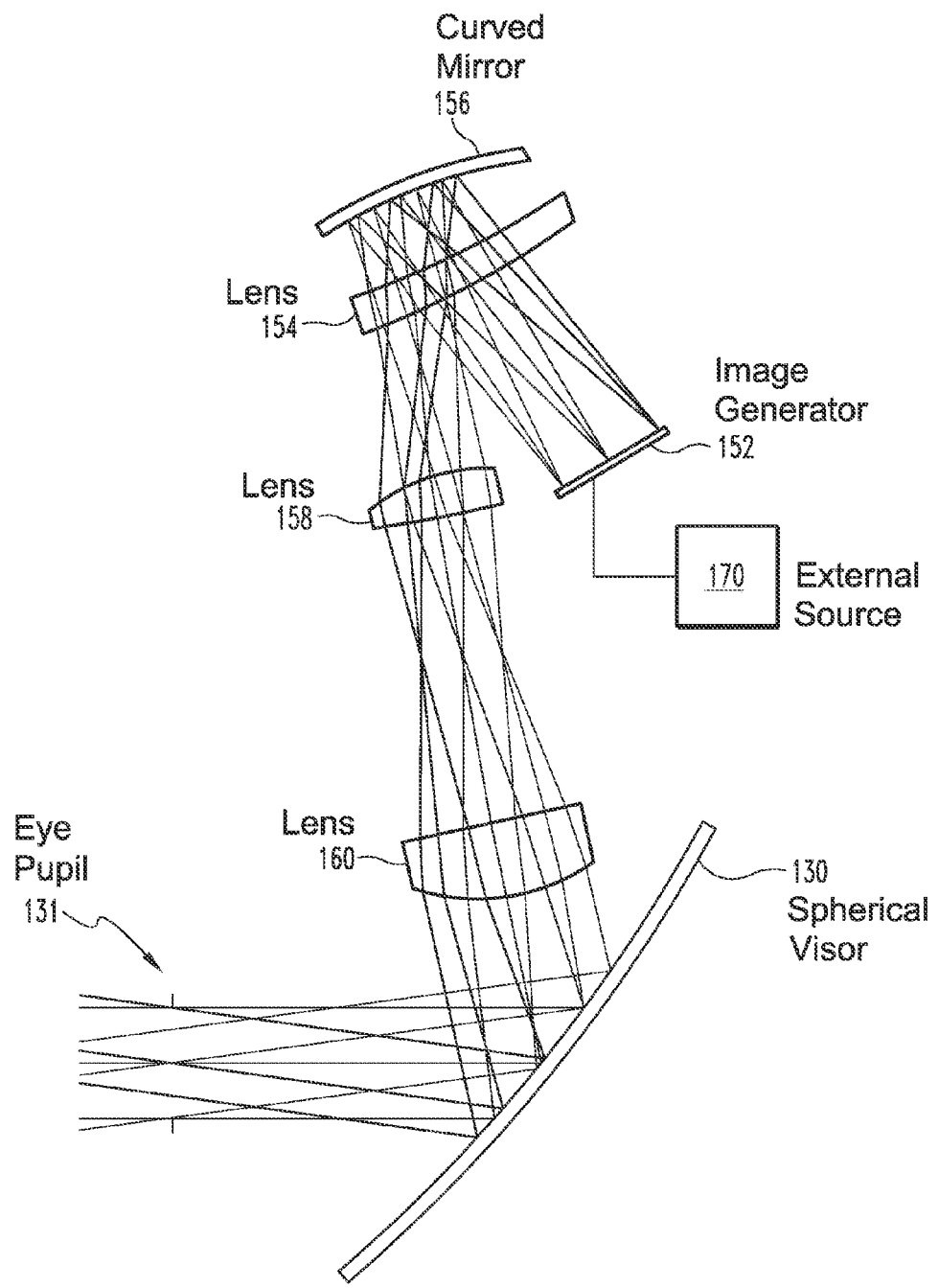
FIG. 3 is a schematic illustration of the optical path through the optical system of the embodiment shown in FIG. 1, unfolded at the planar fold minor for clarity.
Figure 4:
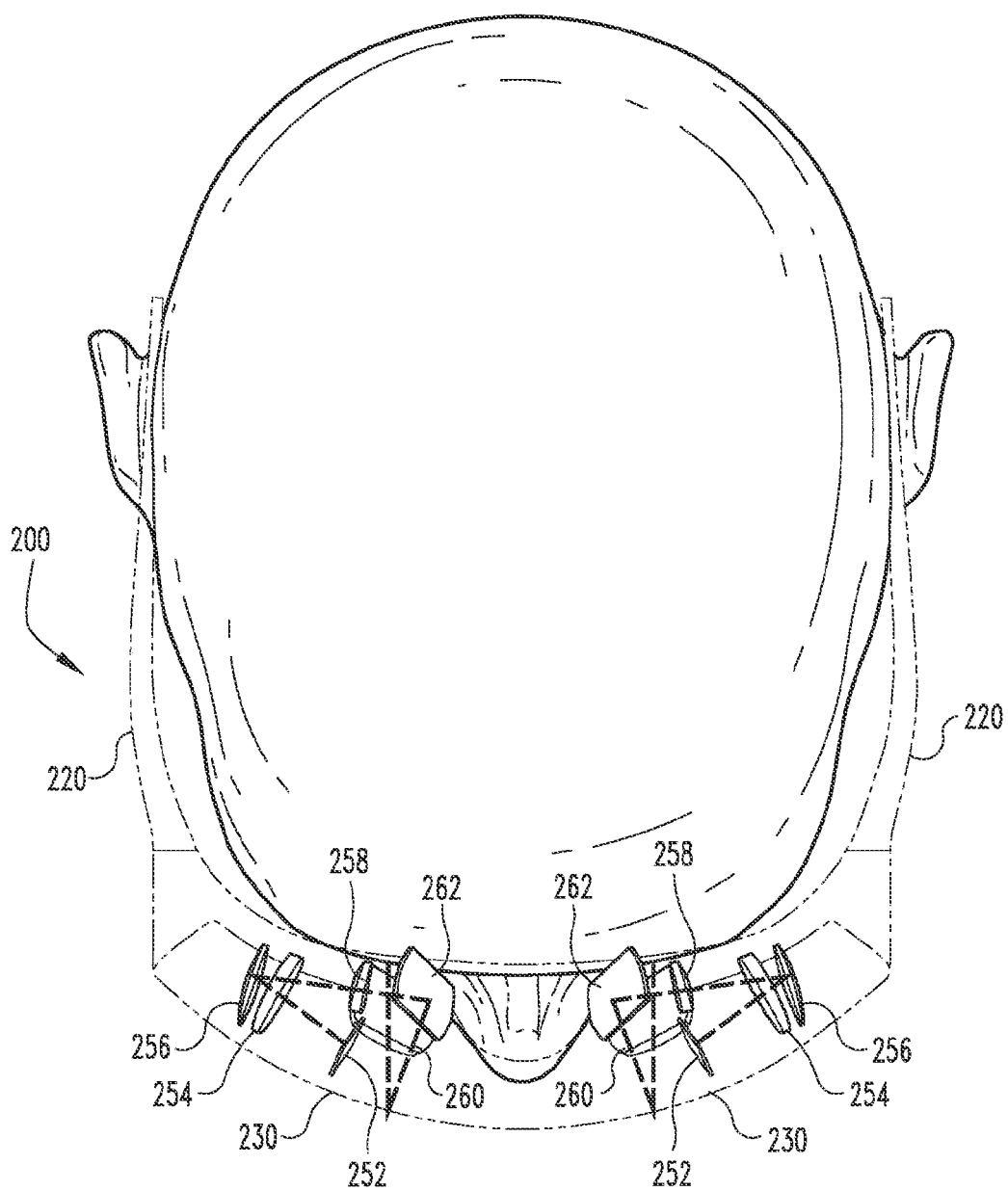
FIG. 4 is a schematic illustration in a top view of the embodiment shown in FIG. 2.

FIG. 3 illustrates a schematic view of the optical path for at least one of optical systems 140, 240, and 245 (shown in FIGS. 1 and 2), which function substantially similarly. For clarity, the optical fold produced by planar mirror 162 has been removed from the optical path in the schematic view of FIG. 3. In the embodiment illustrated in FIG. 3, a data source 170 provides information to image generator 152 with which to generate an image for the heads-up display. Image generator 152 can be an organic light emitting diode (OLED), a liquid crystal display (LCD), and the like.

Light rays of the image produced (i.e., generated and irradiated) by image generator 152 pass through both lens 154, a thin plastic meniscus-type "corrector" lens, before and after it is reflected off a curved (e.g., spherical, aspheric, hyperbolic, elliptical, parabolic, toroid) mirror 156. In one embodiment, this combination of the spherical mirror 156 and cylindrical lens 154 corrects for the astigmatism and distortion that is caused by the spherical visor reflector 130. Mirror 156 in the present embodiment is preferably a spherical front surface mirror. Alternatively, mirror 156 is a rear surface mirror that acts as a Mangin mirror. It can be made of any suitable material, including plastic. Lens 158 is optically matched with lens 160 and lens 154 so as to place and collimate the image at pupil 131 of the user's eye. Lenses 160, 158, and 154 are plastic meniscus lenses in the present embodiment. An intermediate image appears between lens 160 and lens 158. The various lenses and mirrors of the system can be made of glass, plastic, or any other suitable materials. Employing a combination of different plastics for the various lenses and mirrors provides good achromatization of the system, reducing the need for bulkier, heavier glass-type achromats.

Finally, the image reflects off visor 130 of the HUD glasses toward pupil 131 of the observer. Visor 130 in the present embodiment is spherical, though in other embodiments it can be aspheric, parabolic, toroidal, and the like. Furthermore, visor 130 in the present embodiment normally has uniform reflectivity, partial reflectivity, or reflectivity that varies along a viewing direction (e.g., vertically) as in lenses of certain conventional sunglasses. The design implementing a spherical visor is usually more flexible and less sensitive to minor variations in the manufacturing when compared with some other prior art designs.

In the present embodiment, image generator 152 is preferably an OLED type super video graphics array (SVGA) micro-display from eMagin. Other embodiments might use LCD type SVGA display from Kopin or from a similar source (e.g., manufacturer). Either one of these displays can be used in monochrome as well as in full-color modes. However, the OLED type display is preferred in this exemplary embodiment because of generally high brightness capability as well as low power consumption.

Lenses 154 and 160 are preferably made of a light plastic material, such as acrylic or polycarbonate, though other lens materials can be used such as urethane-based monomers. Likewise, mirror 156 may be spherical, aspheric, parabolic, toroidal, and the like, in shape so as to form a suitable combination with lens 154 as well as with the rest of the system. In various embodiments, mirror 156 is made of plastic, glass, metal, or other materials. Mirrors 156 and 162 may be made using a replication process. Lens 158 is preferably made from a polystyrene or polycarbonate type plastic.

Visor 130 is preferably made from plastic and in various embodiments may either be tinted, untinted, treated with variable and/or light-sensitive dynamic tinting, or coated with a thin film reflection coating on one side. This thin film could be applied to an entire internal side (facing the user), or just partially (e.g., to a portion or patch). Particularly, visor 130 is preferably made of polycarbonate plastic or other materials that exhibit shatterproof and impact-resistant qualities for enhanced eye safety. Visor 130 is attached to frame 110 using a variety of methods, such as mechanically and/or chemically (e.g., via adhesives).

The glasses shown in FIG. 2 include an optical system pair that includes optical systems 240, 245 and that each provides a heads-up display image to a respective one of the user's eyes. Each optical system includes an image generator 252, a lens 254, a mirror 256, a lens 258, a mirror 262, a lens 260, and a visor 230 that is operative to reflect a generated HUD image.

To review, the embodiment described in conjunction with FIG. 1 is directed at a HUD optical system 140 that uses a lens 154 that is aligned with curved mirror 156, and through which the image passes twice (i.e., a first time before reflecting off curved mirror 156, and a second time after reflecting). Furthermore, the disclosure herein shows a HUD display system that uses two non-doublet lenses 158 and 160, in combination with lens 154, wherein an intermediate image is formed between lenses 158 and 160.

Figure 5:
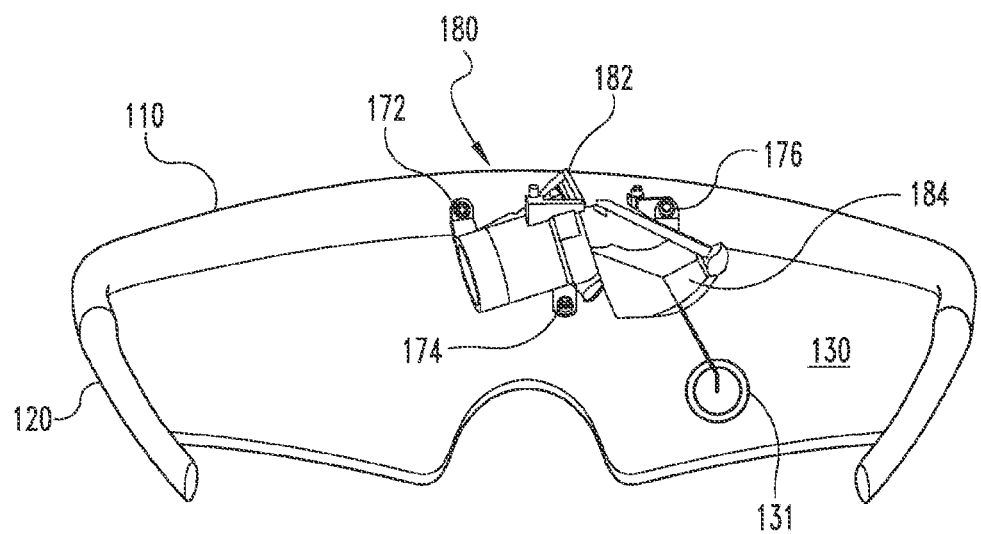
FIG. 5 is a schematic illustration of a rear view of monocular HUD glasses with optical lenses and mirrors enclosed in mechanical housings according to the embodiment of FIG. 1.

Turning to FIG. 5, which is a schematic illustration of a rear view of a monocular HUD glasses with optical lenses and mirrors enclosed in mechanical housings according to the embodiment of FIG. 1. In the embodiment shown in FIG. 5, an optical assembly 180 is attached to frame 110 via attachment features 172, 174, and 176. In various other embodiments, these features may vary in number and location, as well as in type (e.g., use screws, welded joints, molded post attachments, and other methods of attachment) to support optical assembly 180, and in a particular, to support the relative positions of visor 130 and glasses 100. As shown in FIG. 5, optical assembly 180 includes a plastic housing that houses all of the lenses and the mirrors, as well as image generator 152. Generator portion 182 of optical assembly 180 in the present embodiment of FIG. 5 includes image generator 152 (which generates an output image (not shown) toward the left side according to the view shown), lens 154, and mirror 156, as discussed herein above. Output portion 184 of optical assembly 180 includes lenses 158 and 160 (not shown in FIG. 5), and a folding mirror 162 (not shown in FIG. 5). The output image generated from output portion 184 reflects off visor 130 and toward a pupil 131 of a user (not shown in FIG. 5).

Data used to create the dynamic display of information, images, and/or video that appears on the displays in various embodiments is dynamically provided to the first image generator (e.g., image generator 152) by data source 170 in various ways in different embodiments. For example, data may be displayed in character form (i.e., numbers, letters, symbols), as well as showing the user symbology, graphics, video images, or any combination thereof. This data may be provided to image generator 152 by external devices such as sensors (for example, position data via use of a global positioning system (GPS), biometric, etc.), smartphones (for example, images, media, textual, numeric, and symbolic data, etc.). Similarly, still images, dynamically changing graphics, as well as textual, numeric and symbolic data can be produced by video games, portable media players, and the like, and communicated to image generator 152, for example, via wired and/or wireless data transfer techniques (including, for example, Wi-Fi, Bluetooth®, Wi-MAX, and the like).

The embodiments described hereinabove in conjunction with FIGS. 1 through 5 describe an optical system whose principal electro-optical components are located with respect to a user wearing the system, at a region of the forehead that substantially lies above the eyebrows of the user. The following embodiments, in contrast, disclose a user-wearable electro-optical system whose electro-optical unit (i.e., housing the principal electro-optical components) is wholly positioned with respect to the user wearing the system, above the nose and between the eyebrows, or what is also known as the glabella (in humans), the particulars of which will be described and elucidated in the embodiments which follow.

Figure 6A:
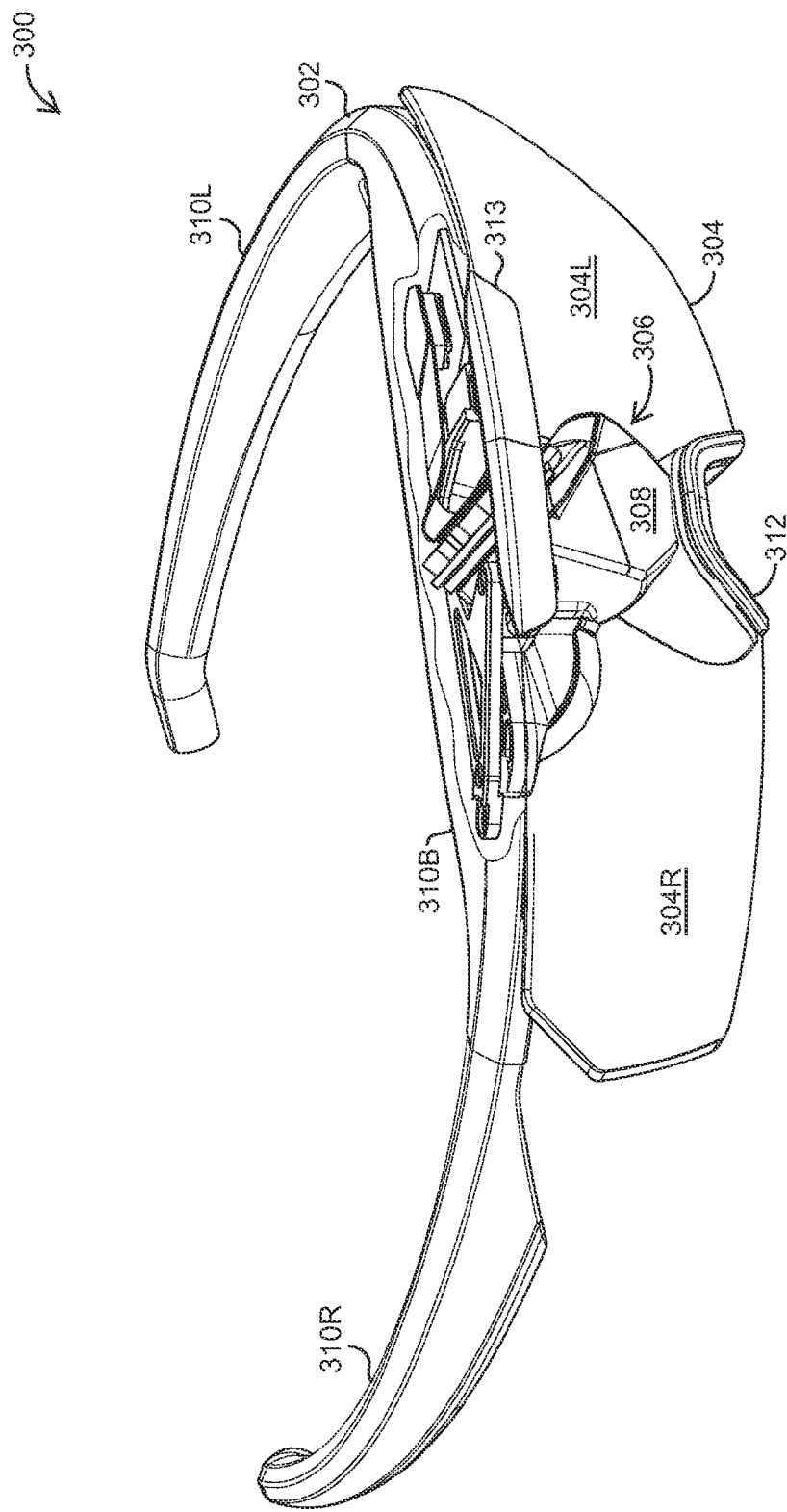
FIG. 6A is a schematic illustration of a user wearable optical display system, constructed and operative in accordance with another embodiment of the disclosed technique.
Figure 6B:
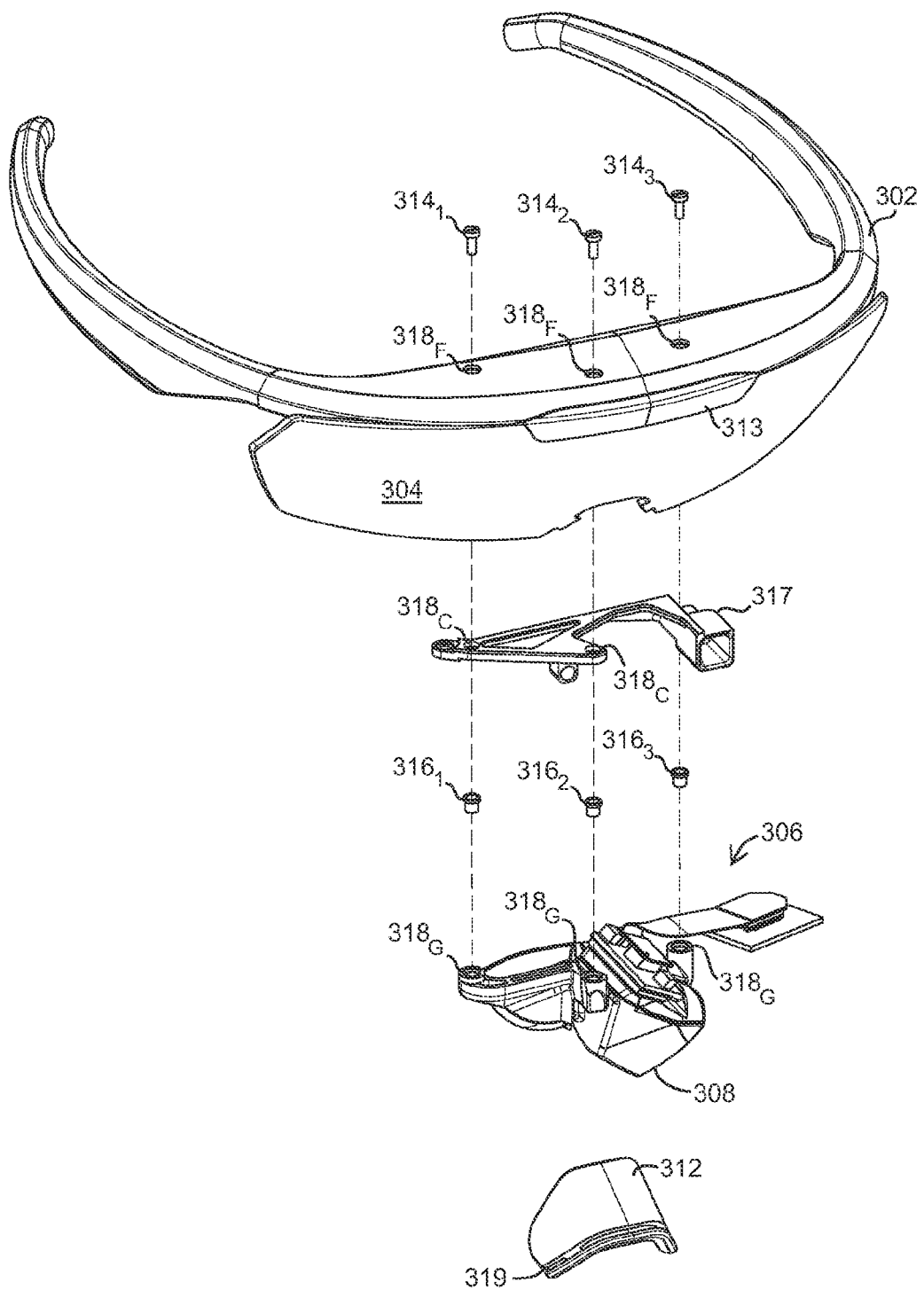
FIG. 6B is a schematic illustration of the user wearable optical display system of FIG. 6A in an exploded view.
Figure 7A:
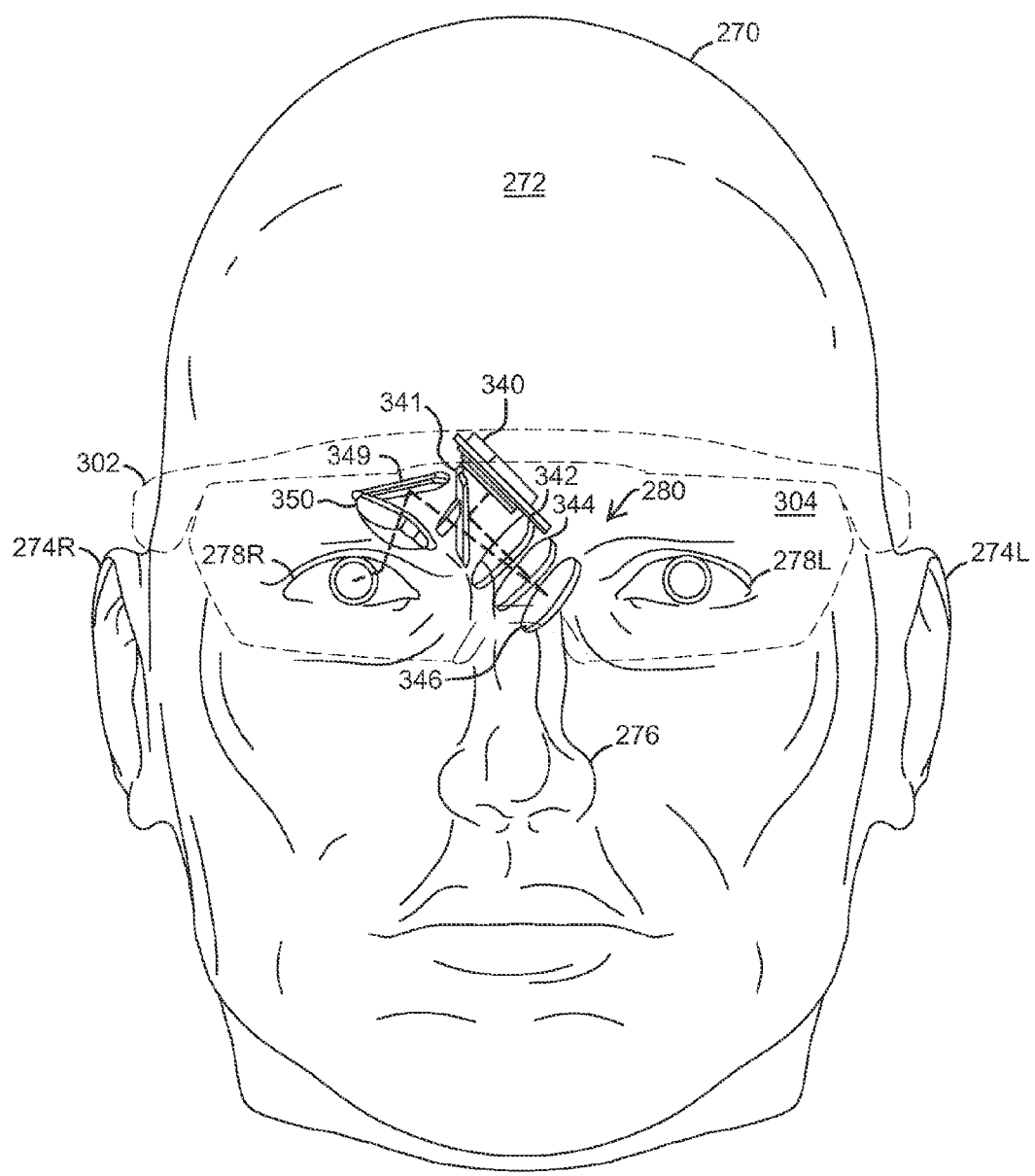
FIG. 7A is a schematic illustration showing the user wearable optical display system of FIG. 6A in a mounted configuration on user.
Figure 7B:
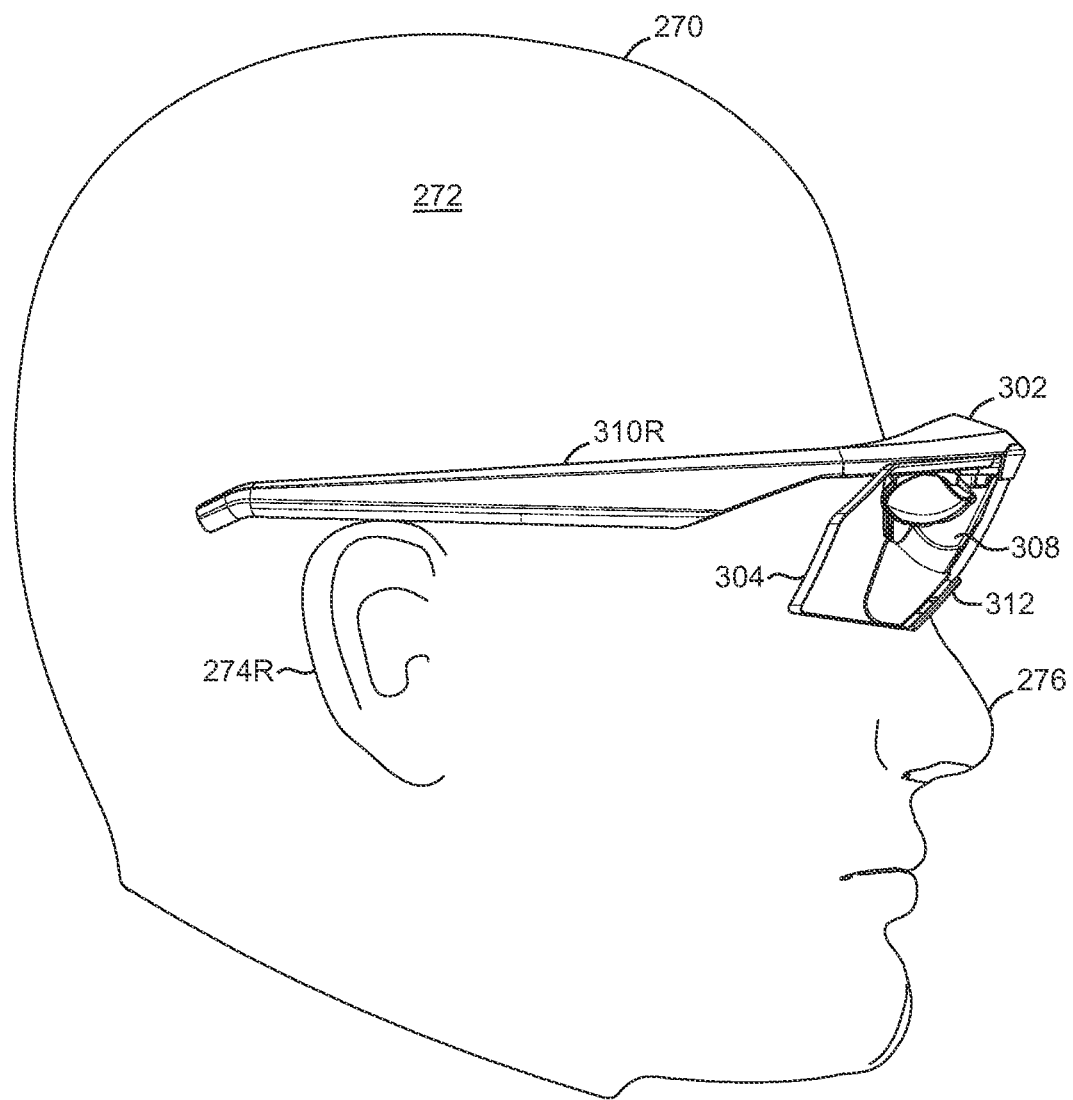
FIG. 7B is a schematic illustration showing a side view of the user wearable optical display system of FIG. 6A in a mounted configuration on user.

Reference is now made to FIGS. 6A, 6B, 7A, and 7B. FIG. 6A is a schematic illustration of a user wearable optical display system, generally referenced 300, constructed and operative in accordance with another embodiment of the disclosed technique. FIG. 6B is a schematic illustration of the user wearable optical display system of FIG. 6A in an exploded view. FIG. 7A is a schematic illustration showing the user wearable optical display system of FIG. 6A in a mounted configuration on user. FIG. 7B is a schematic illustration showing a side view of the user wearable optical display system of FIG. 6A in a mounted configuration on user. User wearable optical display system 300 includes a user attachment section typically in the form of a frame 302, a partially transmissive partially reflective lens 304, and an electro-optical unit 306 that is (at least partially) housed in an electro-optical unit housing 308 (also referred to as the body of electro-optical unit 306). User attachment section 302, which is embodied in the form of a frame (e.g., resembling glasses) includes two temples 310L and 310R (stem portions), a bridge 310B ("bridge portion"), that couples between temples 310L and 310R, and a nosepiece 312. The terms "user attachment section" and "frame" are herein interchangeable and refer to an object configured and operative to couple with a wearer of user wearable optical display system 300. Frame 302 may further include a detachable front section 313. Temples 310R, 310L and nosepiece 312 are constructed and operative to support user wearable optical display system 300, respectively on the ears 274R, 274L and nose 276 of a user 270 (FIGS. 7A and 7B). Frame 302 enables detachable mounting of user wearable optical display system 300 to a head 272 of user 270, as shown in FIGS. 7A and 7B. Partially transmissive partially reflective lens 304 is coupled with frame 302, and configured to be facing the eyes 278R and 278L of user 270 wearing wearable optical display system 300.

With reference to FIG. 6B, electro-optical unit housing 308 is mechanically coupled with frame 302 via a plurality of couplers that include individual couplers (also denoted herein interchangeably as "attachment features", "coupling features", and couplers) embodied as screws $314_1$, $314_2$, $314_3$, screw nutseats $316_1$, $316_2$, $316_3$, and rigid coupling plate 317. Particularly, the coupling between frame 302 and electro-optical unit 306 is achieved via screws $314_1$, $314_2$, $314_3$ which pass through respective receiving through-holes $318_F$ of frame 302 and through respective receiving through-holes $318_C$ of rigid coupling plate 317 such that they respectively engage nutseats $316_1$, $316_2$, $316_3$. The body of electro-optical unit housing 308 includes grooves $318_G$ which are constructed and operative to securely accommodate nutseats $316_1$, $316_2$, and $316_3$. Grooves $318_G$ may be threaded, as well as nutseats $316_1$, $316_2$, $316_3$. Alternatively, other forms of coupling may be employed to couple frame 302 and electro-optical unit 306 (typically via electro-optical unit housing 308), such as by chemical coupling (e.g., by use of adhesives), thermal coupling and binding, magnetic coupling (e.g., by use of magnets), a combination thereof (e.g., with mechanical coupling), and the like. Alternatively, electro-optical unit housing 308 is mechanically coupled with partially transmissive partially reflective lens 304. Further alternatively, electro-optical unit housing 308 is coupled with both frame 302 and with partially transmissive partially reflective lens 304. User wearable optical display system 300 is generally in the form of eyeglasses (e.g., sunglasses), in which partially transmissive partially reflective lens 304 may typically be formed into two distinct pieces, one lens (304L) facing left eye 278L of user 270, the other lens (304R) facing right eye 278R of user 270. The optical properties including the curvature (e.g., spherical, aspheric, hyperbolic, elliptical, parabolic, toroidal, etc.) of each lens piece 304R and 304L are identical to each other or may be different. Alternatively, partially transmissive partially reflective lens 304 is formed as single part.

Electro-optical unit 306 is positioned with respect to frame 302, such that when user wearable optical display system 300 is mounted onto user 270, electro-optical unit 306 is located substantially at the glabellar region 280 of user 270 (FIG. 7A). Glabellar region 280 is defined herein as an area covering the glabella (also known as the mesophryon), which, in humans, is an anatomical area between the eyebrows and above the nose. As shown in FIGS. 7A and 7B, in the mounted (attached) configuration, user wearable optical display system 300 is held firmly in place on user 270 through the engagement and support of temples 310L and 310R with the side (temple) areas of user 270, ears 274L and 274R (right side shown in FIG. 7B), as well as through engagement of nosepiece 312 with nose 276 of user 270. In the mounted configuration, glabellar region 280 (or at least part thereof) may be located, generally, at a mid-section area of bridge portion 310B.

Nosepiece 312 may include an elongated groove 319 (FIG. 6B) for coupling to partially transmissive partially reflective lens 304, such that at least part of elongated groove 319 engages with at least a (cutout) rim part of partially transmissive partially reflective lens 304. Elongated groove 319 may be formed to fixedly accommodate various thicknesses of partially transmissive partially reflective lenses 304. Nosepiece may be made from various materials such as rubber, plastic metal, combinations thereof, and the like. Nosepiece 312 is typically coupled with partially transmissive partially reflective lens 304 and additionally, typically variable in width so as to accommodate different nose dimensions of different users, as well as to provide a precise and stabilized position of the user wearable optical display system with respect to the user's eye(s) position(s). Nosepiece 312 may include nose pads (not shown) to provide a comfortable snug fit to nose 276 of user 270. Preferably, nosepiece 312 is coupled with electro-optical unit housing 308 (not shown in FIG. 6B), as will be described in other embodiments of the disclosed technique. Further alternatively, nosepiece 312 is coupled with either one of electro-optical unit housing 308 and frame 302 (or both for enhanced mechanical support).

Figure 8:
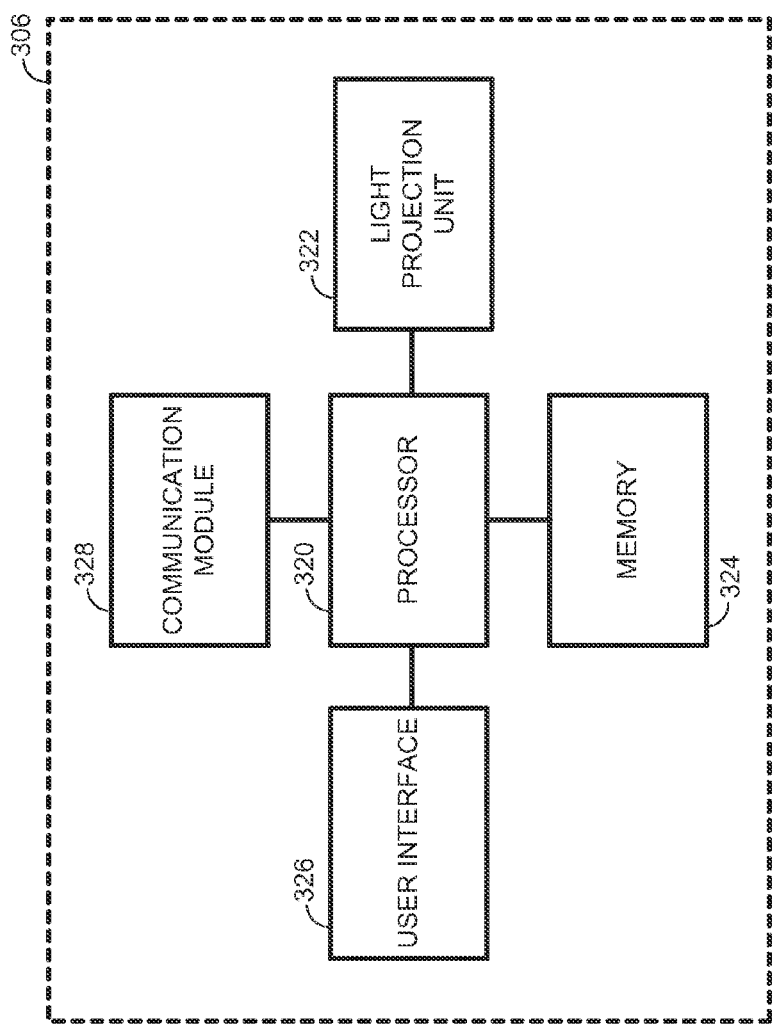
FIG. 8 is a schematic diagram of an electro-optical unit in greater detail with emphasis on the electronic elements thereof, constructed and operative in accordance with the embodiment of FIGS. 6A through 7B of the disclosed technique.
Figure 9:
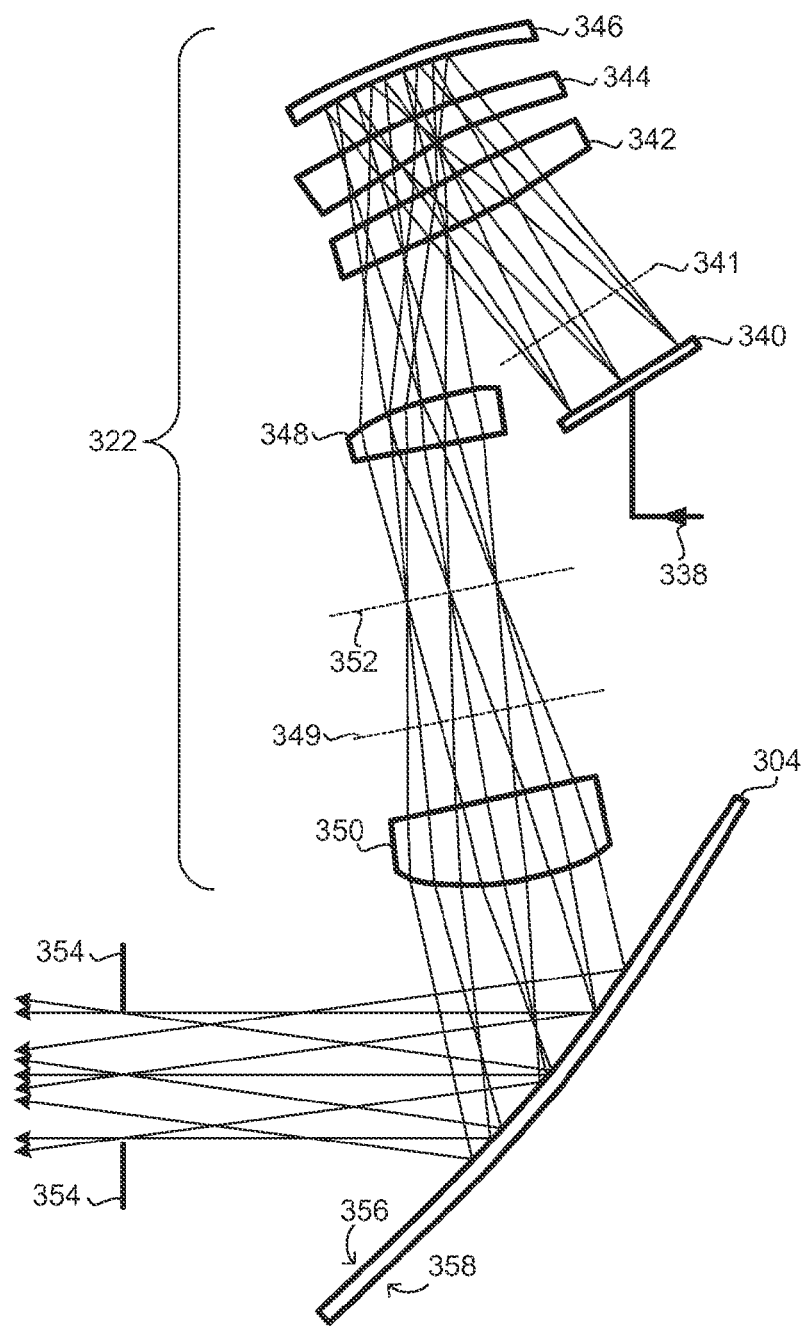
FIG. 9 is an optical path schematic diagram through a light projection unit, with emphasis on the optical elements thereof, constructed and operative in accordance with the embodiment of FIGS. 6A through 7B of the disclosed technique.

Reference is now further made to FIGS. 8 and 9. FIG. 8 is a schematic diagram of an electro-optical unit in greater detail with emphasis on the electronic elements thereof, constructed and operative in accordance with the embodiment of FIGS. 6A through 7B of the disclosed technique. FIG. 9 is an optical path schematic diagram through a light projection unit, with emphasis on the optical elements thereof, constructed and operative in accordance with the embodiment of FIGS. 6A through 7B of the disclosed technique. With reference to FIG. 8, electro-optical unit 306 includes a processor 320, a light projection unit 322, a memory device 324, a user interface 326, and optionally, a communication module 328. Light projection unit 322, memory device 324, user interface 326, and communication module 328 are coupled with processor 320. Electro-optical unit 306 is electrically powered by a power source (not shown). The power source may be embodied in the form of at least one battery that may be housed in temples 310L and 310R (not shown). Alternatively or additionally, solar arrays may be integrated with frame 302 and/or with partially transmissive partially reflective lens 304 (e.g., by employing transparent solar arrays, known in the art (e.g., solar window technology)).

With particular reference to FIG. 9 and referring back to FIG. 7A, light projection unit 322 includes an image generator 340, lenses 342, 344, 348, and 350, and a curved mirror 346, forming an optical arrangement and light ray paths, as illustrated. Optionally, a planar folding mirror 341 (not showing in FIG. 9 the folding of light beams), disposed at a position along an optical path between image generator 340 and lens 342, may be configured and operative for folding (FIG. 7A) the generated light beams, as shown, for example in FIG. 7A. Folding mirror 341 facilitates in the minimization of the spatial dimensions of light projection unit 322 so that electro-optical unit 306 may substantially meet the spatial constraints of being located substantially at glabellar region 280 of user 270. Further optionally, a planar folding mirror 349 (not showing in FIG. 9 the folding of light beams), disposed at a position along an optical path between lenses 348 and 350 may be configured and operative for folding (i.e., specularly reflecting) emerging light beams refracted from lens 348. The optical path of the light beams (i.e., exemplified as rays in FIG. 9 and as a principal light ray in FIG. 7A—denoted by a bolded dotted-line) originate from image generator 340, pass through lenses 342, 344, reflect from curved mirror 346, pass through (i.e., refract) lenses 344 and 342 again, then pass through lenses 348, and 350, and in due course, reflect from partially transmissive partially reflective lens 304 toward at least one of eyes 278R and 278L of user 270, as will be described in greater detail.

In accordance with the disclosed technique, user wearable optical display system 300 is configured and operative to generate and to project light encoded data (i.e., light containing data) in the form of a light representation (e.g., an image, graphical information, symbology, etc.) onto partially transmissive partially reflective lens 304, the latter of which is configured and operative concurrently, to at least partially reflect the light (i.e., which is encoded with data or that contains information) toward the eyes of the user who wears the system, as well as to at least partially transmit incoming light from a scene in the user's field of regard (i.e., outward-facing environment with respect to the user). Partially transmissive partially reflective lens 304 essentially acts as an optically collimated transparent (or translucent) display enabling the overlay of images and other data projected onto its surfaces, without obstructing a scene viewed by the user. Processor 320 (FIG. 8) is configured and operative to generate data (not shown), for example in the form of electrical signals that convey image data and/or graphical representation data and to transmit this data to light projection unit 322. The data is typically stored, retrieved and may furthermore be manipulated and modified in memory device 324 that is generally embodied in the form of non-volatile memory (e.g., read-only memory (ROM), flash memory, magnetic storage devices (e.g., hard disks), ferroelectric read-only memory (F-RAM), optical memory (e.g., optical discs), etc.) as well as volatile memory (e.g., RAM).

Light projection unit 322 is configured and operative to receive data from processor 320, generate light encoded data based on the data received therefrom, and to project the light encoded data onto partially transmissive partially reflective lens 304. The terms "light encoded data" and "light encoded information" used interchangeably herein, generally refer to light that is encoded with data, and more specifically, to light that contains information that is exhibited in at least one domain, such as in the spectral domain (i.e., wavelengths—colors), in the spatial domain (e.g., in one or multi-dimensions, such as a one-dimensional (1-D) image (e.g., a point, or pixel), a two-dimensional (2-D) image, a three-dimensional (3-D) image), in the temporal domain (e.g., changing—frame rate), in the polarization domain (e.g., by using light polarization encoding techniques), and the like. For example, in case where the encoded data is 2-D color video, the light encoded data that is generated and projected exhibits change in the temporal domain (i.e., as a succession of image frames), in the spatial domain (i.e., as changes in the image space—as in the case of moving objects within the image frames), in the color domain (i.e., representing the different colors of objects in the images), as well in the light intensity domain (i.e., representing, for example the luminance).

Specifically, image generator 340 (FIG. 9) of light projection unit 322 receives data (denoted by arrow 338) from processor 320, and generates a collimated light beam (encoded with data) shown representationally in FIG. 9 as a plurality of light rays emanating (irradiating) from image generator 340 toward lens 342. Lens 342, which is typically a convex-concave (meniscus) lens, refracts this light beam and relays the refracted light beam toward lens 344, the latter of which is optically aligned with respect to lens 342. Lens 344 refracts the refracted light beam relayed from lens 342 and directs the beam toward curved mirror 346, the latter of which is optically aligned with the former. Lens 344 is typically a concave-convex (meniscus) lens, and curved mirror 346 is typically a concave spherical (front surface or alternatively, a rear surface) mirror. Alternatively, mirror 346 may exhibit curvatures other than spherical, such as aspherical, hyberbolic, elliptical, parabolic, toroidal, and the like. The optical elements group (combination) which includes lens 342, lens 344, and curved mirror 346 is constructed and optically arranged to correct aberrations such as astigmatism and distortion that is caused by the optical characteristics such as the curvature of partially transmissive partially reflective lens 304. The refracted light beam arriving from lens 344 impinges curved mirror 346 such that the consequent reflected light beam is directed to pass (again) through lens 344 and lens 342, thereby forming an angle with respect to the incoming refracted light beam. Hence, the reflected light beam from curved mirror 346 refracts once again through lenses 342 and 344, at which point the emerging refracted light beam is directed toward lens 348.

The combination of curved mirror 346 and lenses 342 and 344 allow the incoming light beam generated and irradiated from image generator 340 to pass (refract) twice through lenses 342 and 344, thereby enabling pre-emptive correction of astigmatism and distortion caused when the light beam reflects off partially transmissive partially reflective lens 304. Generally, in oblique astigmatism, off-axis rays of light from radial and tangential lines in an object plane focus at different distances in the image space. The utilization of lens 344 with lens 342 in the optical arrangement functions to increase the optical power of the optical system by decreasing the overall focal length of optical elements and in effect, enabling a reduction of the physical dimensions of light projection unit 322, as well as further enabling tweaks for minimizing astigmatism and distortion.

Lens 348 receives the refracted light beam from lens 342 and lens 344, refracts and relays the light beam toward lens 350. Lenses 348 and 350 are typically of biconvex type (although other types may be used, e.g., plano-convex). Lens 348 is optically configured and operative to form an intermediate image at an intermediate image plane 352 located at a position along an optical path between lens 348 and lens 350. Further located at a position along this optical path between lenses 348 and 350 is positioned light beam folding mirror 349, which is optically configured and operative to specularly reflect light beams from lens 348 toward lens 350 (FIG. 7A). Folding mirror 349 further facilitates in the minimization of the spatial dimensions of light projection unit 322 so that electro-optical unit 306 may substantially meet the spatial constraints of being located substantially at glabellar region 280 of user 270. The formation of an intermediate image facilitates in the magnification of on outputted generated image, as well as in the widening of the field of view (FOV) that is presented to the user. The formed intermediate image is an aberration-compensated image (or aberration-corrected image) owing to the optical arrangement (and optical characteristics) of curved mirror 344 and lenses 342 and 342. This aberration-compensated formed intermediate image forestalls aberrations produced, at least partially, by the curvature of partially transmissive partially reflective lens 304, such that light rays incident upon and reflecting therefrom are aberration-corrected.

Partially transmissive partially reflective lens 304 is constructed and operative to partially reflect the light beam impinging thereon from an image source (i.e., image generator 340), and partially transmit incoming light from an outward translucent view in the ambient environment (i.e., a scene). Effectively, partially transmissive partially reflective lens 304 functions as a light combiner, such that light from the image source and light from the outward scene are combined to form a combined image (not shown) that is directed and provided to at least one eye of the user. Partially transmissive partially reflective lens 304 may be considered to include a user-facing surface 356 and an outward-facing surface 358 that are generally opposite each other. Partially transmissive partially reflective lens 304 typically possesses a curvature (e.g., spherical, ellipsoidal, etc.). Partially transmissive partially reflective lens 304 is constructed to optically be a thin lens (i.e., the radii of curvatures of user-facing surface 356 and outward-facing surface 358 are almost one and the same) so as to minimize or to at least reduce optical distortion effects, such as prismatic deviation, etc. A prismatic deviation is a change in direction of a light ray path due to refraction.

Partially transmissive partially reflective lens 304 is typically constructed from rigid, durable, lens-grade materials such as glass (e.g., optical crown glass), polycarbonate, Trivex®, and the like, as well as at least one reflective optical coating layer whose thickness (at least to some degree) determines its reflective characteristics. The ratio of reflection to transmission, which is typically dependent on the wavelength of light incident on partially transmissive partially reflective lens 304, may vary. Typical reflection percentages typically lie between 20-40%; whereas typical total transmission percentages lie between 8-70%. Any ratio derived from these percentages is viable. In particular, there may be more than one reflection to transmission ratios of partially transmissive partially reflective lens 304 (which may be different or the same). One reflection to transmission ratio is associated with light impinging on user-facing surface 356 (produced by image generator 340), the other associated with light impinging on outward facing surface 358 of partially transmissive partially reflective lens 304. According to one realization, the reflectivity of outward facing surface 358 may be greater than the reflectivity of user-facing surface 356. Other, different realizations may be possible, for example, where outward facing surface 358 (i.e., and/or at least part of partially transmissive partially reflective lens 304) may be embedded with silver halide (silver salts) in microcrystalline form that endow photochromic properties to the lens. Optionally, an antireflection coating may also be applied to outward facing surface 358. Further optionally, an anti-abrasion coating may also be applied to partially transmissive partially reflective lens 304. Further optionally, an anti-fog coating may be applied to partially transmissive partially reflective lens 304. Further optionally, partially transmissive partially reflective lens 304 may be coated and/or incorporate light-polarized material, which generally enhances the contrast of an image viewed through the lens (e.g., especially noticeable in snow covered environments). Partially transmissive partially reflective lens 304 employs shatter resistant ("shatterproof") materials (e.g., polyvinyl butyral (PVB), ethylene-vinyl acetate (EVA), thermoplastic polyurethane (TPU), polyethylene terephthalate (PET), polycarbonate (PC), combinations thereof, etc.) in its construction and/or manufacture such that it exhibits shatterproof and impact-resistant qualities. Moreover, partially transmissive partially reflective lens 304 complies with known safety standards of eyewear in general, and eyewear (e.g., sunglasses) used for sporting applications, in particular.

After the light beam reflects from partially transmissive partially reflective lens 304 it is passed through an aperture (stop) 354 toward at least one eye of user 270 (indicated by light ray arrows). The opening of aperture 354 may be controlled (via processor 320) so as to admit varying degrees of light flux (i.e., radiant flux density or irradiance) therethrough as well as to control the degree of light collimation. Aperture 354 may be embodied in the form of an electromechanical aperture mechanism such as those utilized, for example, in digital cameras. Alternatively, aperture 354 is the pupil (not shown) in one of the eyes of user.

Communication module 328 is configured and operative to transmit and to receive data to-and-fro electro-optical unit 306. For example, communication module 328 may receive data to be first transformed into light representation data and then projected by light projection unit 322 onto partially transmissive partially reflective lens 304. Communication module 328 is further configured and operative to communicate with peripheral communication devices (not shown), such as Wi-Fi routers, computer servers, Bluetooth® enabled devices, Internet-enabled devices, and the like. User interface 326 is configured and operative to receive, transmit, and provide (e.g., present) data, respectively from and to the user. User interface 326 is preferably a human-machine interface (HMI) that may include graphical user interfaces (GUIs) (e.g., via touchscreens), voice user interfaces, gesture user interfaces, user-motion tracking interfaces, user-gaze tracking input interfaces, text-based user interfaces, non-command user interfaces (inferring user behavior), and the like. User interface 326 may be coupled with frame 302, such as along temples 310L, 310R, and bridge portion 310B (not shown). In addition, user interface 326 may include at least one microphone (not shown, e.g., for receiving voice commands) as well as at least one loudspeaker (not shown, e.g., for generating sounds to be conveyed to the user, as well as to the user's surrounding environment).

Image generator 340 is configured and operative as a near-eye display, typically embodied in the form of an organic light emitting diode (OLED) display. Alternatively, image generator 340 may employ other types of display technologies, such as those of liquid crystal displays (LCDs), electroluminescent displays (ELDs), liquid crystal on silicon (LCoS/LCOS) displays, active-matrix liquid-crystal display (AMLCD), quantum dot display (QLED), and the like.

User wearable optical display system 300 provides user 270 who wears the system with both an unobstructed viewing capability of visual scenes within the user's field of regard (FOR) as well as simultaneously enabling light encoded data to be presented to the user within that FOR. In contrast to prior art systems that at least partially block the user's FOR by positioning at least some non-transparent functional elements in front of the eyes of the user, thereby reducing the user's FOR, the system of the disclosed technique is optically configured and constructed to exhibit reduced physical dimensions such as to allow electro-optical unit 306 to be substantially positioned at the glabellar region of the user, so as to minimize hardware obstructions to the user's FOR.

Figure 10A:
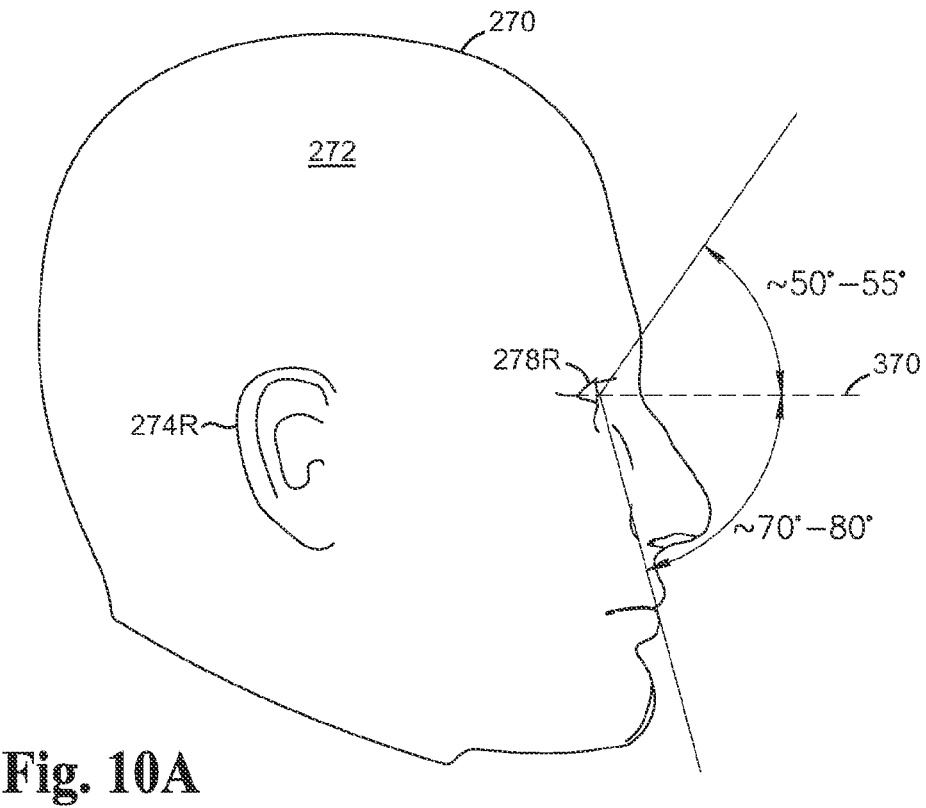
FIG. 10A is a schematic diagram illustrating a typical vertical field of regard provided to a user wearing user wearable optical display system.
Figure 10B:
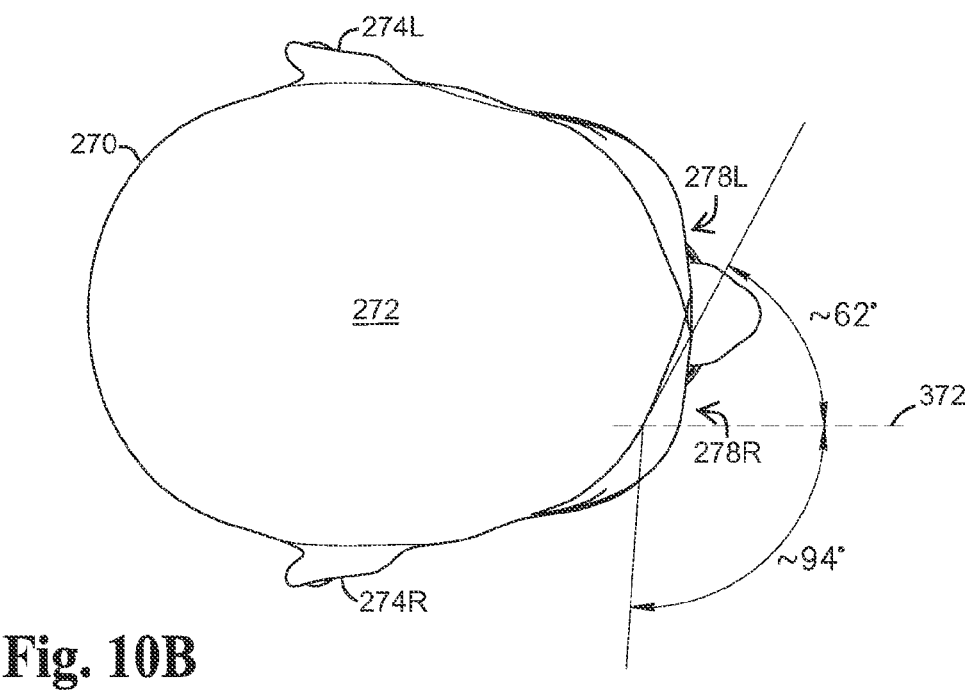
FIG. 10B is a schematic diagram illustrating a typical horizontal field of regard provided to a user wearing user wearable optical display system.

To further detail the enhanced FOR afforded to the user by user wearable optical display system 300, reference is now further made to FIGS. 10A and 10B. FIG. 10A is a schematic diagram illustrating a typical vertical field of regard provided to a user wearing user wearable optical display system. FIG. 10B is a schematic diagram illustrating a typical horizontal field of regard provided to a user wearing user wearable optical display system. FIG. 10A illustrates a right side view of head 272 of user 270 showing a typical vertical FOR afforded to user 270, who wears user wearable optical display system 300 (not shown for clarity purposes), with respect to a horizontal (level, e.g., horizon) viewing angle axis 370. The vertical FOR that is above horizontal viewing angle axis 370 (i.e., in an upward vertical viewing direction) is approximately between 50°-55°. The vertical FOR afforded to user 270 that is below horizontal viewing angle axis 370 (i.e., in a downward vertical viewing direction) is approximately between 70°-80°. Hence the total vertical FOR afforded to user 270 is approximately between 120°-135°.

FIG. 10B illustrates a top view of head 272 of user 270 showing a typical horizontal FOR afforded to user 270, who wears user wearable optical display system 300 (not shown), with respect to a (right eye) centerline axis 372 (i.e., the "central line-of-sight (LOS) axis", or "central forward-looking gaze direction"). The horizontal FOR for (right) eye 278R of user 270 to the left (i.e., in a leftward direction) of centerline axis 372 is approximately 62°. The horizontal FOR for (right) eye 278R of user 270 to the right (i.e., in a rightward direction) of centerline axis 372 is approximately 94°. The typical horizontal FOR for (left) eye 278L (i.e., with respect to a left centerline axis (not shown)) is similar to that of (right) eye 278R. Hence, the total horizontal FOR afforded to each eye of user 270 is approximately 156°.

According to another embodiment of the disclosed technique, there is provided an optical display system that is configured for coupling to a user wearable optical device (e.g., eyewear, such as eyeglasses, sunglasses, etc.) where the user wearable device includes a frame that is configured for detachably mounting the user wearable optical device to a head of a user. This coupling may be detachable (such as clip-on) or fixed (such as in a permanent attachment). In essence, the optical display system is configured, constructed and operative to be coupled with various (e.g., different) frames of user wearable optical devices of different users. These frames may be constructed from different materials, may be formed in different shapes and sizes (i.e., adaptable to different users), as well as exhibit different colors, designs (e.g., catering to different user preferences), and the like.

Figure 11:
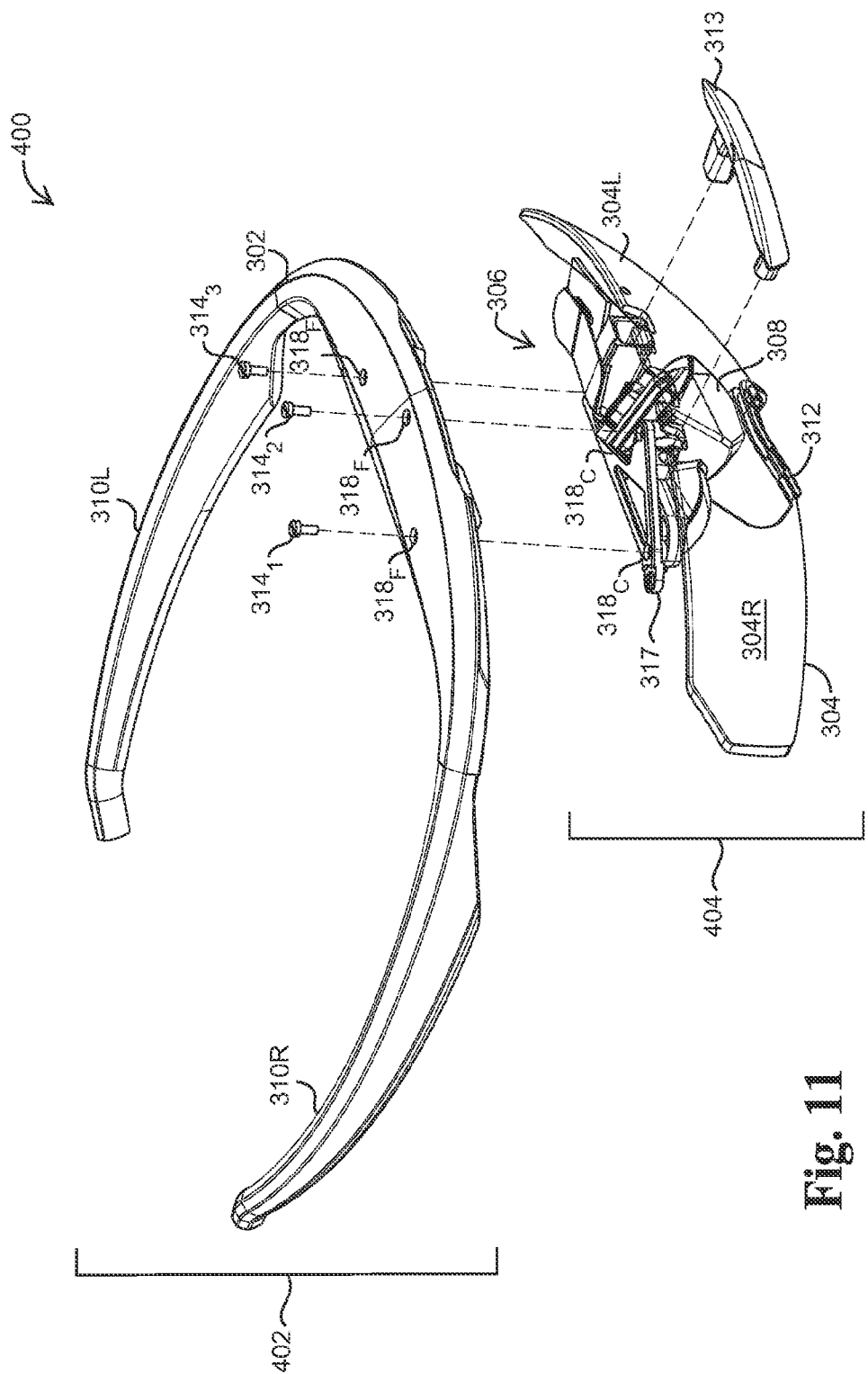
FIG. 11 is a schematic illustration in a partially exploded view showing a coupling configuration between one main part that includes the electro-optical unit and the partially transmissive partially reflective lens and another main part that includes the frame, of the user wearable optical display system of FIG. 6A, constructed and operative according to another embodiment of the disclosed technique.

To further detail the particulars of the present embodiment, reference is now made to FIG. 11, which is a schematic illustration in a partially exploded view showing a coupling configuration between one main part that includes the electro-optical unit and the partially transmissive partially reflective lens and another main part that includes the frame, of the user wearable optical display system of FIG. 6A, generally referenced 400, constructed and operative according to another embodiment of the disclosed technique. All components of the present embodiment, shown and described in conjunction with FIG. 11, are identical with respective elements shown in the previous embodiment described in conjunction with FIGS. 6A, 6B, 7A, 7B, 8, 9, 10A and 10B (and thus retain same reference numbers). The coupling configuration shown in FIG. 11, demonstrates the coupling between two main parts, one of which is frame 302 (denoted as main part 402), the other main part 404 includes both electro-optical unit 306 (shown with housing 308), and partially transmissive partially reflective lens 304 (as well as typically nosepiece 312). Further shown are a plurality of couplers (coupling features), also denoted as attachment features $314_1$, $314_2$, and $314_3$, (embodied as screws) and front section 313. As shown in FIG. 11, electro-optical unit housing 308, which at least partially houses electro-optical unit 306, is coupled with partially transmissive partially reflective lens 304 and nosepiece 312 (mechanically, adhesively, etc.). According to the present coupling configuration shown in FIG. 11, main parts 402 and 404 are coupled together via a plurality of coupling features $314_1$, $314_2$, and $314_3$ (e.g., embodied in the form of screws). The coupling of main parts 402 and 404 is achieved via coupling features $314_1$, $314_2$, and $314_3$ which pass through respective receiving through-holes $318_F$ of frame 302 and such to engage respectively with complementary receiving members (not shown—e.g., the nutseats of FIG. 6B) that are coupled with the body of electro-optical unit housing 308. Rigid coupling plate 317 is typically configured and employed for augmenting the coupling (i.e., of main parts 402 and 404). Once main parts 402 and 404 are coupled, electro-optical unit 306 is configured to be positioned with respect to frame 302 such that when optical display system 400 is mounted on the user, electro-optical unit 306 is substantially located at the glabellar region of the user.

Alternatively, rigid coupling plate 317 is not utilized and coupling features $314_1$, $314_2$, and $314_3$ are coupled directly to the body of electro-optical unit housing 308. Other forms of mechanical coupling may be employed (not shown) such as through the use of clip-on (snap) fasteners, rivets or pins, complementary or mating interlocking parts (e.g., sleeves and shafts, studs and grooves, integrated projections and slots, etc.), and the like. Alternatively, other types of coupling methods may be employed (not shown) such as through the use of adhesive materials, thermoplastic joining techniques, welding or soldering of metallic parts comprising main part 404 (such as metallic rigid coupling plate 317) with respective corresponding metallic features (not shown)

of main part 402 (frame 302), etc. Further alternatively, a combination of coupling methods may be used together (e.g., mechanical and chemical coupling).

According to a further embodiment of the disclosed technique, there is provided an optical display system that is configured for coupling to a user wearable optical device (e.g., eyewear, such as eyeglasses, sunglasses, etc.) where the user wearable device includes a user attachment section (e.g., a frame) and a partially transmissive partially reflective lens (or lenses) configured for detachably mounting the user wearable optical device to a head of a user.

Similarly to the previous embodiment described in conjunction with FIG. 11, this coupling may be detachable or fixed. Basically, the optical display system is configured, constructed and operative to be coupled with various (e.g., different) frames and lenses of user wearable optical devices (e.g., eyeglasses, sunglasses, etc.) of different users. The frames may be constructed from different materials (e.g., plastic, metal, nylon, etc.), may be formed in different shapes and sizes (i.e., adaptable to different users), as well as exhibit different colors, designs (e.g., catering to different user preferences), and the like. The partially transmissive partially reflective lens, which is coupled with the frame, may possess and/or exhibit various optical characteristics. In general, the term "optical characteristic" referenced herein either in singular or in plural, ascribed or pertaining to a particular object, refers to any attribute, quality, trait, property and phenomenon in the science of optics that defines, influences, characterizes, determines, describes, and is associated with that object. Example optical characteristics of partially transmissive partially reflective lens 304 include the diopter, refractive index, curvature, Abbe number, power error(s), lens induced astigmatism, transmission coefficient, reflection coefficient, spectral (e.g., ultraviolet) cutoff wavelength, spectral transmission and reflection profile, lens dimensions (e.g., thickness), lens color (e.g., color-tinted), etc.

Figure 12:
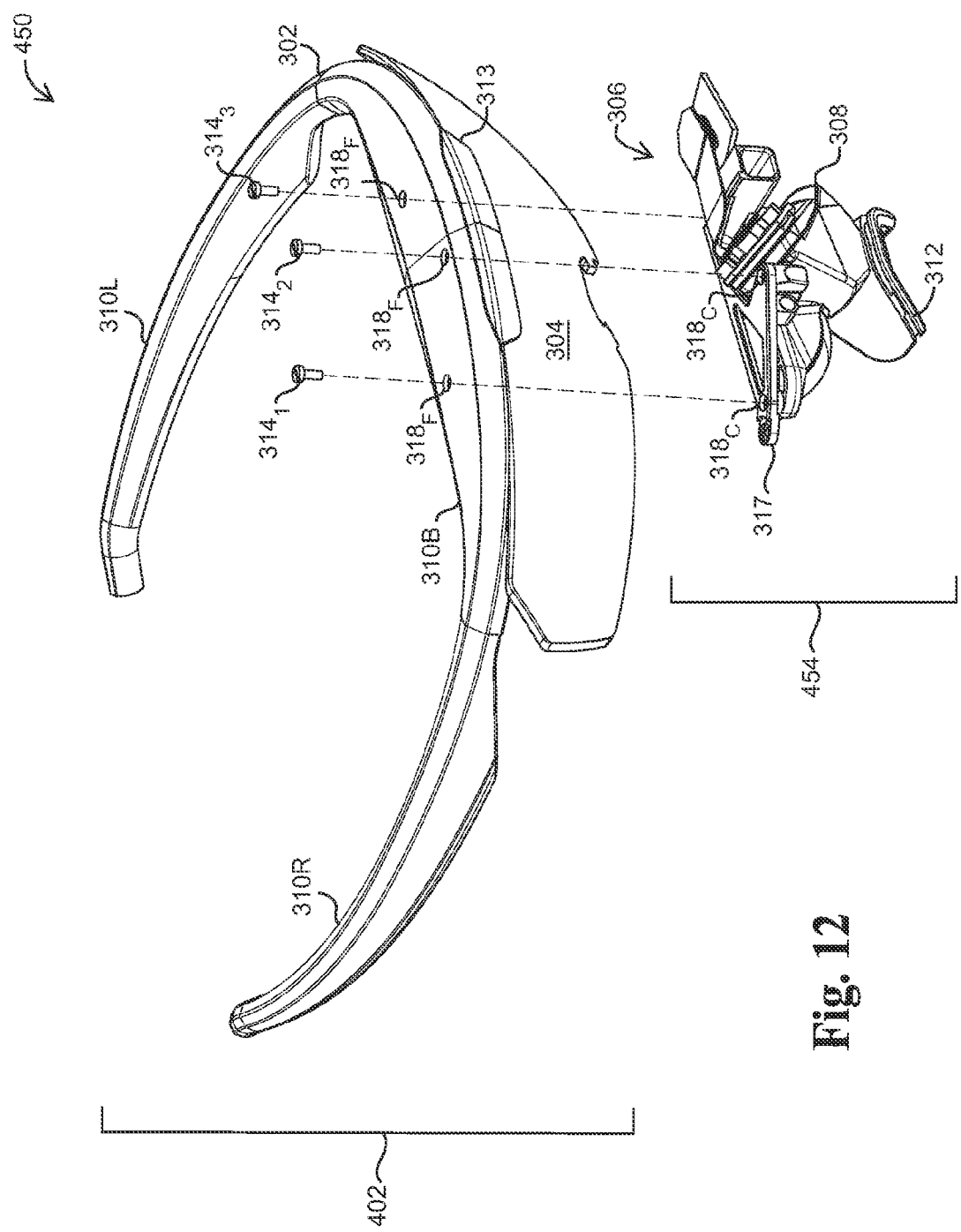
FIG. 12 is a schematic illustration in a partially exploded view showing a coupling configuration between one main part that includes the electro-optical unit and another main part that includes the partially transmissive partially reflective lens and the frame, of the user wearable optical display system of FIG. 6A, constructed and operative according to a further embodiment of the disclosed technique.

To further detail the particulars of the present embodiment, reference is now made to FIG. 12, which is a schematic illustration in a partially exploded view showing a coupling configuration between one main part that includes the electro-optical unit and another main part that includes the partially transmissive partially reflective lens and the frame, of the user wearable optical display system of FIG. 6A, generally referenced 450, constructed and operative according to a further embodiment of the disclosed technique. All components of the present embodiment, shown and described in conjunction with FIG. 12, are identical with respective elements shown in the embodiment described in conjunction with FIGS. 6A, 6B, 7A, 7B, 8, 9, 10A and 10B (and thus retain same reference numbers). The coupling configuration shown in FIG. 12, demonstrates the coupling between two main parts. One main part, denoted 452, includes both frame 302 and partially transmissive partially reflective lens 304. Another main part, denoted 454, includes electro-optical unit 306 (shown with housing 308 as well as with nosepiece 312). Further shown are a plurality of couplers (coupling features), also denoted as attachment features $314_1$, $314_2$, and $314_3$, (embodied as screws) and front section 313 (included in main part 452). Electro-optical unit housing 308, which at least partially houses electro-optical unit 306, is coupled with nosepiece 312 (mechanically, adhesively, etc.).

Similarly to the previous embodiment described in conjunction with FIG. 11, the present embodiment described in conjunction with FIG. 12 discloses a (different) coupling configuration in which main parts 452 and 454 are coupled together via a plurality of coupling features $314_1$, $314_2$, and $314_3$ (e.g., shown to be embodied in the form of screws). For the coupling to be realized, main parts 452 and 454 are initially positioned with respect to one another in such a manner that enables each of coupling features $314_1$, $314_2$, and $314_3$ to pass through respective receiving through-holes $318_E$ of frame 302 and to engage respectively with complementary receiving members (not shown—e.g., the nutseats of FIG. 6B) that are coupled with the body of electro-optical unit housing 308. Rigid coupling plate 317 is typically configured and employed for augmenting the coupling (i.e., of main parts 452 and 454). Alternatively, rigid coupling plate 317 is not utilized and coupling features $314_1$, $314_2$, and $314_3$ are coupled directly to the body of electro-optical unit housing 308. Once main parts 452 and 454 are coupled, electro-optical unit 306 is configured to be positioned with respect to frame 302 such that when optical display system 450 is mounted on the user, electro-optical unit 306 is substantially located at the glabellar region of the user.

Other forms of mechanical coupling may be employed (not shown) such as through the use of clip-on (snap) fasteners, rivets or pins, complementary or mating interlocking parts (e.g., sleeves and shafts, studs and grooves, integrated projections and slots, etc.), and the like. Alternatively, other types of coupling methods may be employed (not shown) such as by chemical coupling (e.g., through the use of adhesive materials), thermoplastic joining techniques, magnetic coupling (e.g., through use of magnets, for example of rare-earth type), welding or soldering of metallic parts comprising main part 454 (such as metallic rigid coupling plate 317) with respective corresponding metallic features (not shown) of main part 452 (frame 302), etc. In accordance with this coupling configuration, nosepiece 312 may typically also be coupled with partially transmissive partially reflective lens 304 in the manner described hereinabove in conjunction with FIGS. 6A and 6B.

According to the present embodiment of the disclosed technique, electro-optical unit 306 is configured to be adaptable, operationally including optically, to different partially transmissive partially reflective lenses 304 that possess and/or exhibit different optical characteristics. Given main part 452, to which the other main part 454 is configured to couple therewith, electro-optical unit 306 needs to further be optically compliant with the optical characteristics of partially transmissive partially reflective lens 304. In other words, different users may have different optical or optometric prescriptions and/or requirements for optically-corrective eyewear, which in turn may be exhibited by different requisites for the optical characteristics of partially transmissive partially reflective lens. For that purpose, the disclosed technique provides an optical adaptability scheme whereby electro-optical unit 306 is configured and operative to receive as input (or to store) data pertaining to different optical characteristics of partially transmissive partially reflective lens 304. Once the optical characteristics of the partially transmissive partially reflective lens 304 are known, electro-optical unit 306 is configured and operative to apply adjustments (if applicable) to the generated image (i.e., the light encoded data) generated by image generator 340 (FIG. 9). These adjustments may be calculated by processor 320 (FIG. 9). To further elucidate the particulars of this aspect of the disclosed technique, reference is further made to FIG. 13, which is a schematic diagram illustrating an aspect of the optical adaptability scheme, generally referenced 470, constructed and operative according to particular embodiments of the disclosed technique.

Figure 13:
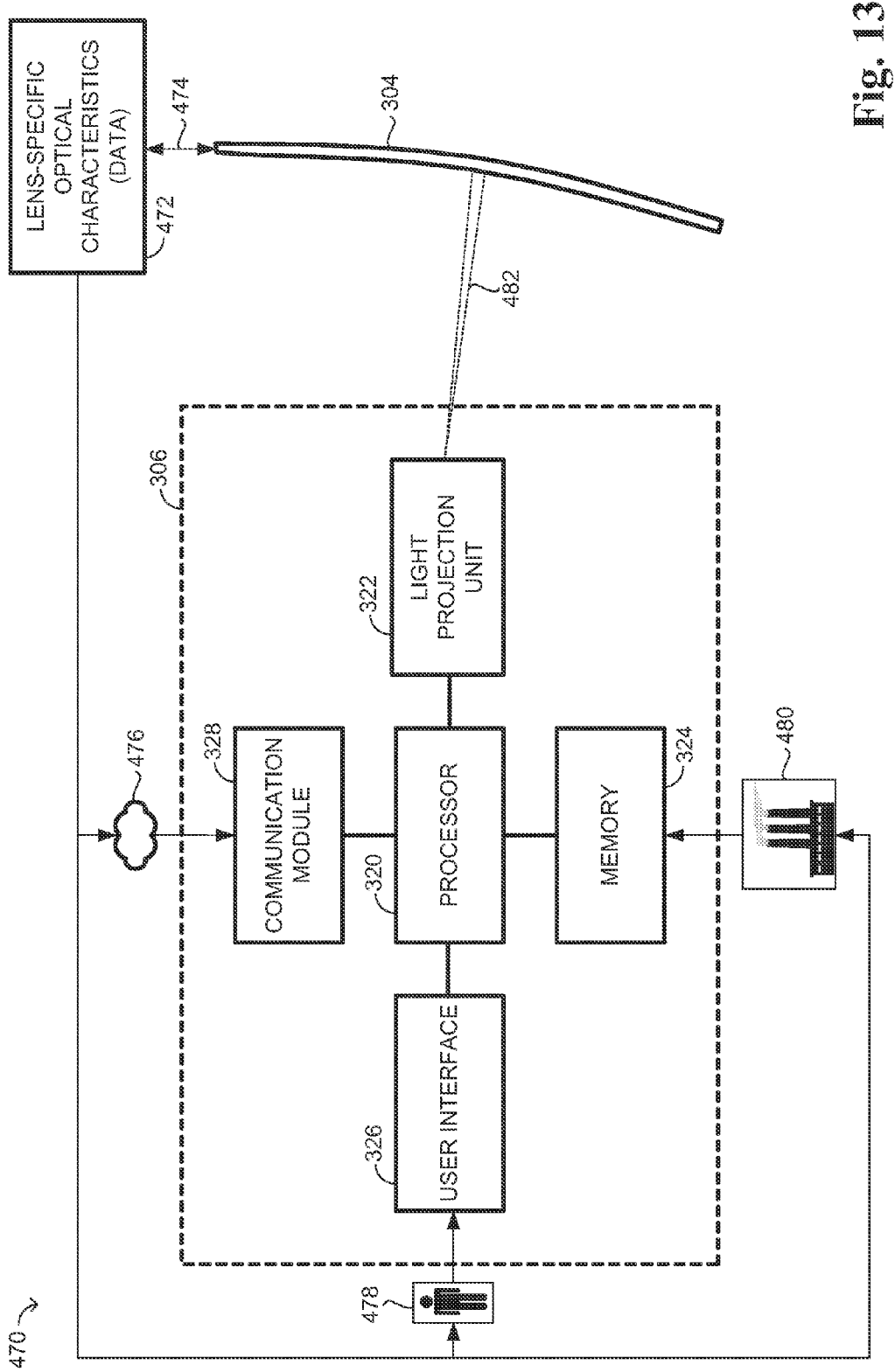
FIG. 13 is a schematic diagram illustrating an aspect of the optical adaptability scheme, constructed and operative according to particular embodiments of the disclosed technique.

FIG. 13 illustrates a schematic diagram that shows a general outline of an optical adaptability scheme used for matching the optical characteristics of a given partially transmissive partially reflective lens 304 to the optical characteristics of an image projected on that lens (i.e., 304). Given that the optical characteristics of partially transmissive partially reflective lens 304 are known (typically from the manufacturer), these optical characteristics are associated (arrow 474 in FIG. 13) with lens-specific optical characteristic data 474. In essence, lens-specific optical characteristic data 474 is data pertaining to the optical characteristics of a particular lens. This lens-specific optical characteristic data 474 may be conveyed to electro-optical unit 306 by various ways. For example, lens-specific optical characteristic data 474 (i.e., or at least part or derivative thereof) is communicated to communication module 328 of electro-optical unit 306 via communication methods known in the art (e.g., the Internet, ad hoc computer connections or networks, wireless radiofrequency technology and standards (e.g., Bluetooth®, Wi-Fi, cellular communication, etc.), collectively represented by 476. Additionally or alternatively, lens-specific optical characteristic data 474 (i.e., or at least part or derivative thereof, including data associated therewith) is inputted to user interface 326 directly by user 270 (e.g., via the Internet, via the inputting of a code, etc.), technical personnel, robots, and the like (collectively represented by 478). Additionally or further alternatively, lens-specific optical characteristic data 474 (i.e., or at least part or derivative thereof) may be inputted and stored in memory device 480 (e.g., as a look-up table for various lenses and their corresponding optical characteristics) by the manufacturer, assembly plant, vender, reseller, marketer, and the like (collectively represented by 480). The lens-specific optical characteristic data 474 is communicated to processor 320 that is configured and operative to apply modifications (if applicable) to the image data and/or graphical representation data that is outputted to light projection unit 322, so that the light encoded data 482 projected onto partially transmissive partially reflective lens 304 substantially meets what is intended to be presented to user 270. In other words, given that different lenses exhibit different optical characteristics, any light encoded data (e.g., in the form of an image) that interacts with the lens (e.g., by reflection, refraction), may be altered (e.g., deformed, distorted) in a manner that was not intended, thus altering the image that is reflected from the lens and presented to the user. To circumvent such possible alterations, processor 320 uses known lens-specific optical characteristic data 474 to apply pre-emptive modifications to the image data. Modifications to the image data may be mathematically computed (via algorithms, transformations, etc.) and stored in memory device 324 (e.g., as a look-up table, algorithm, mathematical functions, etc.).

According to another embodiment of the disclosed technique, there is provided an optical display system that is constructed to allow coupling with various partially transmissive partially reflective lenses exhibiting different optical characteristics. In accordance with this embodiment, the user attachment section (e.g., the frame) and the electro-optical unit are coupled together as a single entity that is configured and operative to receive and to couple thereto a partially transmissive partially reflective lens adapted and selectable to have different optical characteristics (e.g., including tinted-lenses, prescription lenses, etc.). To further detail the particulars of the present embodiment, reference is now made to FIG. 14, which is a schematic illustration in a partially exploded view showing a coupling configuration, generally referenced 500, between one main part that includes the frame and the electro-optical unit and another main part that includes the partially transmissive partially reflective lens, of the user wearable optical display system of FIG. 6A, constructed and operative according to another embodiment of the disclosed technique. All components of the present embodiment, shown and described in conjunction with FIG. 14, are identical with respective elements shown in the previous embodiments described in conjunction with FIGS. 6A, 6B, 7A, 7B, 8, 9, 10A and 10B (and thus retain same reference numbers).

Figure 14:
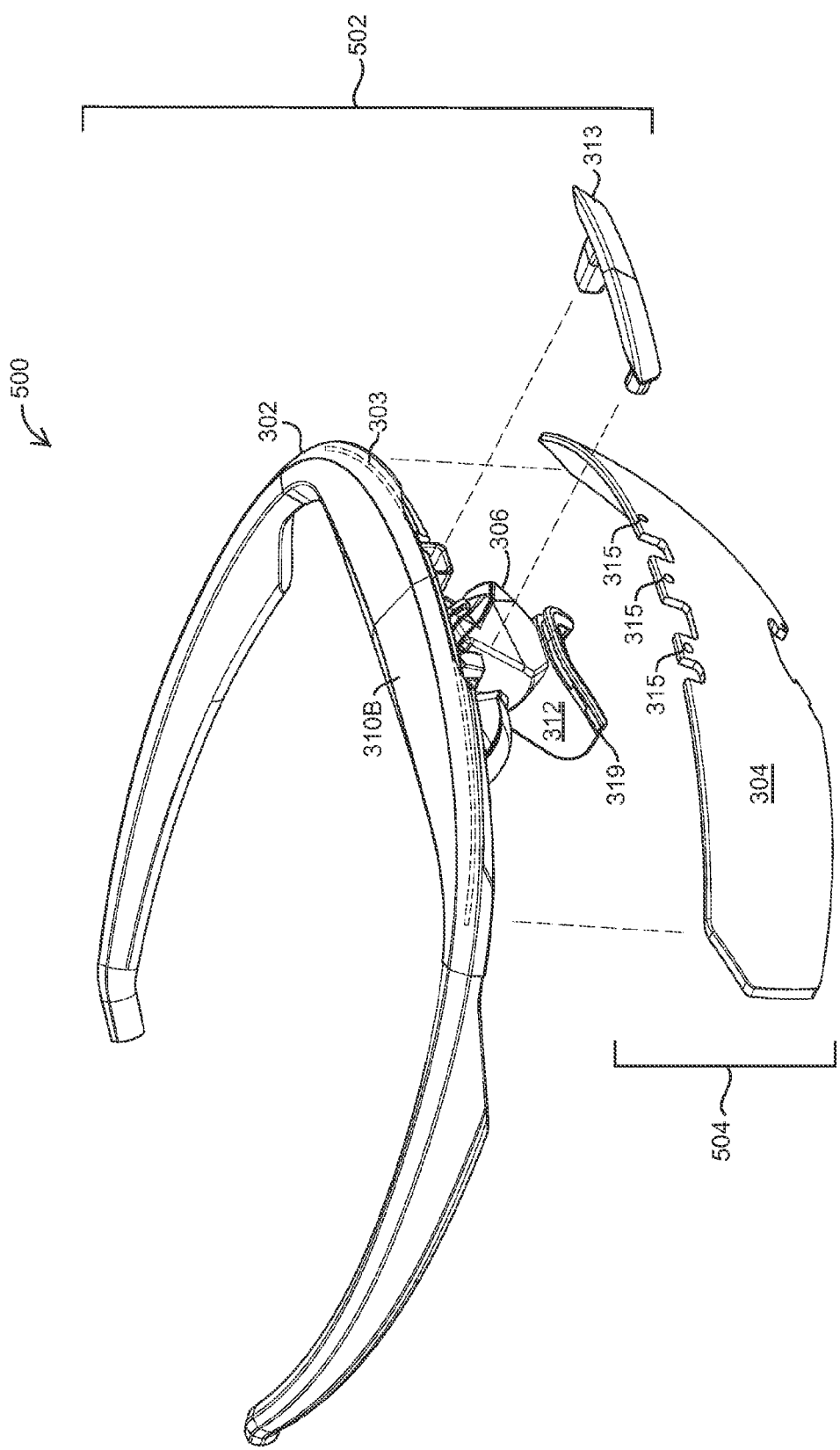
FIG. 14 is a schematic illustration in a partially exploded view showing a coupling configuration between one main part that includes the frame and the electro-optical unit and another main part that includes the partially transmissive partially reflective lens, of the user wearable optical display system of FIG. 6A, constructed and operative according to another embodiment of the disclosed technique.

FIG. 14 shows user wearable optical display system in a coupling configuration 500, in which there are two main parts, namely 502 and 504. Main part 502 includes frame 302, electro-optical unit 306, nosepiece 312, and detachable front section 313. Main part 504 includes partially transmissive partially reflective lens 304. Coupling between main parts 502 and 504 is achieved as described hereinbelow. This coupling may be detachable (i.e., temporary) or fixed (i.e., permanent). Firstly, partially transmissive partially reflective lens 304 is aligned with frame 302, as shown in FIG. 14. Secondly, the upper part of partially transmissive partially reflective lens 304 at least partially abuts (i.e., is inserted and accommodated into) a curved longitudinal groove 303 that extends along a bridge portion 310B of frame 302 that connects two temple portions 302R and 302L of frame 302. The curvature of curved longitudinal groove 303 and curvature of the top engaging portion of partially transmissive partially reflective lens 304 are substantially matched. The lower part of partially transmissive partially reflective lens 304 includes a cutout portion that complementarily engages with elongated groove 319 of nosepiece 312. Thirdly, the coupling between partially transmissive partially reflective lens and frame 302 may further be augmented via use of couplers, also denoted as attachment features (not shown, e.g., screws, pins, etc.), such to provide enhanced mechanical conjoining. The attachment features are configured to pass, each respectively, through one of through-holes 315 of partially transmissive partially reflective lens 304 and into corresponding receiving holes (not shown) of frame 302. Lastly, detachable front section 313 engages complementarily with frame 302 through cutout portions of partially transmissive partially reflective lens 304, as shown in FIG. 14 so as to firmly secure main parts 502 and 504 together. The optical adaptability scheme described hereinabove in conjunction with FIG. 13 may be employed in the present embodiment so as to match the operation of electro-optical unit 306 (e.g., optical characteristics of generated image) with the specific optical characteristics of partially transmissive partially reflective lens 304.

The disclosed technique allows for different types of couplings to be used for coupling the user wearable optical display system with the head of the user. In embodiments heretofore presented, described and illustrated, the typical coupling was in the form of elongated temples (of glasses) configured to be predominately supported by the ears, as well as to facilitate ancillary support by the temple (side) areas of the head. It is emphasized that the disclosed technique is not limited to a particular coupling, but rather compatible with diverse methods for coupling. For example, other types of coupling may include flexible adjustable straps that embrace the head of the user, helmets or hats that are worn by the user, and the like. To describe such an alternative coupling, reference is now made to FIG. 15, which is a schematic illustration showing an example alternative coupling of the user wearable optical display system with the head of the user, generally referenced 550, constructed and operative in accordance with a further embodiment of the disclosed technique. All components of the present embodiment, shown and described in conjunction with FIG. 15, are identical with respective elements shown in the previous embodiments described in conjunction with FIGS. 6A, 6B, 7A, 7B, 8, 9, 10A and 10B (and thus retain same reference numbers), apart from frame 302 and part of the body 308 of electro-optical unit 306.

Figure 15:
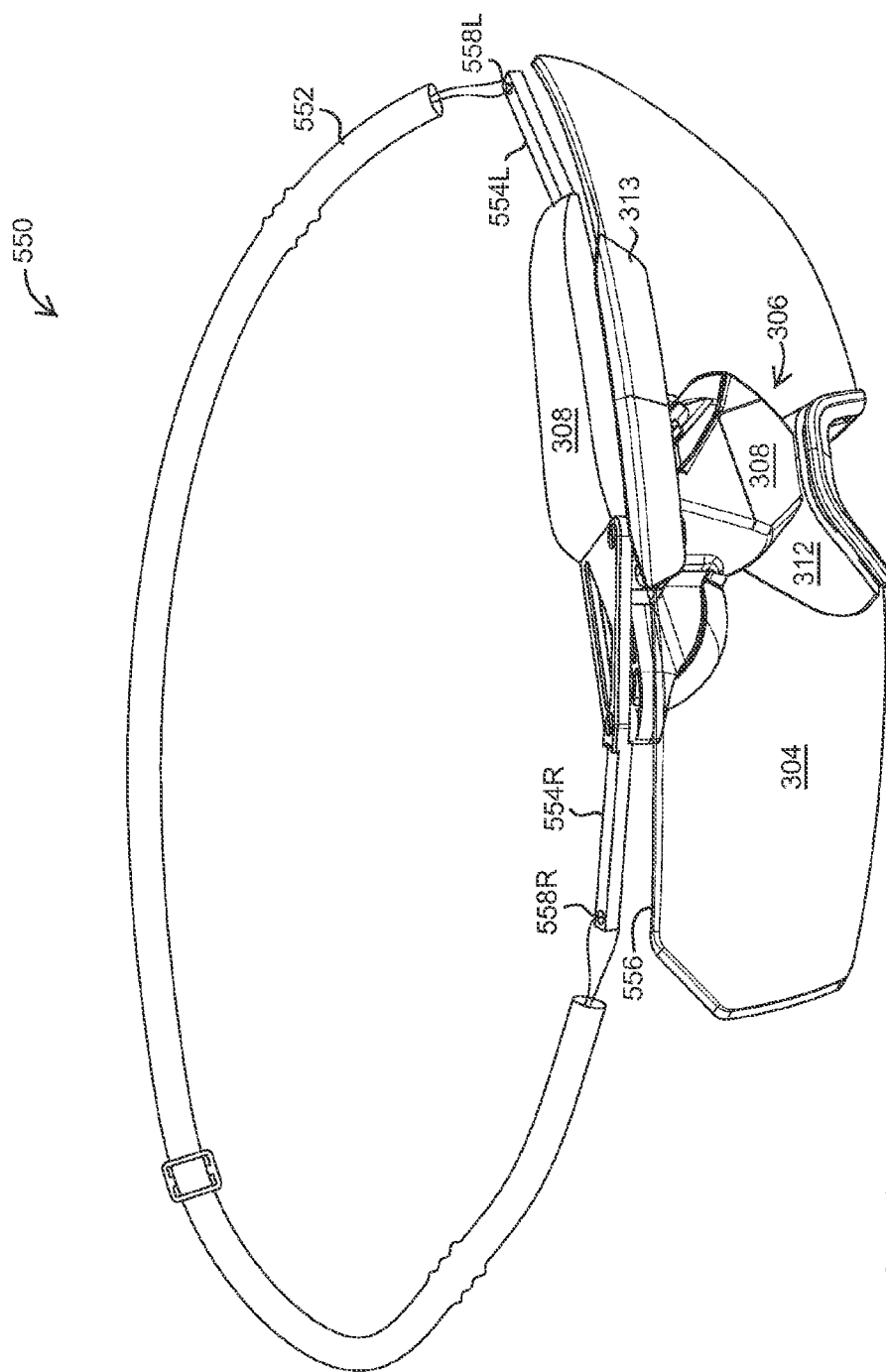
FIG. 15 is a schematic illustration showing an example alternative coupling of the user wearable optical display system with the head of the user, constructed and operative in accordance with a further embodiment of the disclosed technique.

FIG. 15 demonstrates another example of a user attachable section embodied in the form of a flexible adjustable strap 552 (i.e., a type of fastener). The body or housing 308 of electro-optical unit 306 has been slightly modified structurally with respect to that shown in FIG. 6A, so as to cover and shield the electronics (e.g., processor, memory, interconnections, etc.) from the surrounding environment. Optionally, weather-sealing techniques known in the art may be employed. User wearable optical display system 550 embodies additional modifications to housing 308 so as to include elongated support structures 554R and 554L that are constructed at least partially to generally follow along the extent and curvature of an upper rim portion 556 of partially transmissive partially reflective lens 304. Either one or both elongated support structures 554R and 554L typically include attachment features exemplified in FIG. 15 in the form of through-holes 558R and 558L for coupling flexible adjustable strap 552 thereto. Flexible adjustable strap 552 is constructed and operative to be length-wise adjustable so as to allow fastening to different head dimensions (e.g., sizes, circumferences), while concurrently being elastic to enable quick and easy uncoupling (un-mounting) from the head. Flexible adjustable strap 552 is basically a head strap that can assume other forms, configurations, and shapes. Alternatively, other variations to flexible adjustable strap 552 include, for example, an encircling headband (not shown), an encircling headband incorporating a head apex crossing strap configuration (not shown), a double strap configuration (not shown), a strap incorporating a chin strap (not shown), a headband with wireframe helmet configuration (not shown), general head coverings, and the like. Flexible adjustable strap 552 may be made from fabric, leather, metal, rubber, paper, combinations thereof, and the like. It is to be understood that a myriad of variations, arrangements, alterations, and modifications (etc.) may be made to the structures, attributes, qualities, dimensions, designs, configurations (etc.) of the various constituents shown and described in the embodiments without departing from the spirit of the disclosed technique.

It will be appreciated by persons skilled in the art that the disclosed technique is not limited to what has been particularly shown and described hereinabove. Rather the scope of the disclosed technique is defined only by the claims, which follow.

The invention claimed is:

1. A user wearable optical display system comprising:
a user attachment section for detachably mounting said user wearable optical display system to a head of a user;
a partially transmissive partially reflective lens, coupled with said user attachment section, and configured to be facing at least one eye of said user; and
an electro-optical unit coupled with at least one of said user attachment section and said partially transmissive partially reflective lens, said electro-optical unit comprising:
a processor; and
a light projection unit coupled with said processor, said light projection unit is configured to transmit light beams onto said partially transmissive partially reflective lens, said light projection unit is configured to be located at a glabellar region of said user,
wherein said electro-optical unit is configured to be positioned with respect to said user attachment section such that when said user wearable optical display system is mounted on said user, said electro-optical unit is located at said glabellar region of said user, thereby providing a substantially unobstructed field of regard (FOR) to said user.

2. The user wearable optical display system according to claim 1, wherein said user attachment section is a frame that includes a bridge portion and two stem portions.

3. The user wearable optical display system according to claim 1, further comprising a nosepiece that is coupled with at least one of said electro-optical unit and said partially transmissive partially reflective lens.

4. The user wearable optical display system according to claim 1, wherein said partially transmissive partially reflective lens is curved.

5. The user wearable optical display system according to claim 1, wherein said light projection unit includes an image generator configured to generate and irradiate said light beams that are encoded with information.

6. The user wearable optical display system according to claim 5, wherein said light projection unit further includes:
a first lens;
a second lens;
a third lens;
a fourth lens; and
a curved mirror.

7. The user wearable optical display system according to claim 6, wherein said image generator, said first lens, said second lens, said third lens, said fourth lens, and said curved mirror are in fixed positions with respect to each other, so as to allow said light beams to travel an optical path through said first lens, then through said second lens, then to reflect from said curved mirror and pass again through said second lens and through said first lens, then toward said third lens, then through said fourth lens, and then to reflect from said partially transmissive partially reflective lens toward at least one eye of said user.

8. The user wearable optical display system according to claim 7, further comprising a planar mirror positioned between said image generator and said first lens, for reflecting said light beams in said optical path.

9. The user wearable optical display system according to claim 7, further comprising a planar mirror positioned between said third lens and said fourth lens, for reflecting said light beams in said optical path.

10. The user wearable optical display system according to claim 1, wherein said partially transmissive partially reflective lens is configured to partially reflect said light beams generated by said light projection unit toward at least one eye of said user, and to partially transmit therethrough light incoming from a forward-facing environment with respect to said user.

11. The user wearable optical display system according to claim 1, further comprising a user interface, coupled with said processor, configured to receive input from said user.

12. The user wearable optical display system according to claim 5, wherein said information encoded in said light beams is exhibited in at least one domain that is selected from a list consisting of:
spectral domain;
spatial domain;
temporal domain;
light intensity domain; and
polarization domain.

13. The user wearable optical display system according to claim 1, further comprising an electro-optical unit body that at least partially encloses said electro-optical unit.

14. The user wearable optical display system according to claim 6, wherein said curved mirror is selected from a list of mirror types consisting of:
 a spherical mirror;
 an aspherical mirror;
 a hyberbolic mirror;
 an elliptical mirror;
 a parabolic mirror; and
 a toroidal mirror.

15. The user wearable optical display system according to claim 6, wherein a combination of optical elements that includes said first lens, said second lens, and said curved mirror is configured to correct for optical aberrations at least partly due to a curved surface of said partially transmissive partially reflective lens.

16. The user wearable optical display system according to claim 15, wherein said optical aberrations include at least one of astigmatism and distortion.

17. The user wearable optical display system according to claim 6, wherein said light beams refract by said first lens and said second lens, then reflect from said curved mirror, such to refract again by said second lens and said first lens.

18. The user wearable optical display system according to claim 6, wherein the combination of said first lens and said second lens increases the optical power of said light projection unit.

19. The user wearable optical display system according to claim 7, wherein said third lens forms an intermediate image that appears at an intermediate image plane located along said optical path between said third lens and said fourth lens.

20. The user wearable optical display system according to claim 1, wherein said partially transmissive partially reflective lens is a thin lens constructed to reduce optical distortion effects including prismatic deviation.

21. The user wearable optical display system according to claim 1, wherein said FOR afforded to said user in an upward vertical direction with respect to the horizon is approximately between 50° and 55°.

22. The user wearable optical display system according to claim 1, wherein said FOR afforded to said user in a downward vertical direction with respect the horizon is approximately between 70° and 80°.

23. The user wearable optical display system according to claim 1, wherein said FOR afforded to a right eye of said user in a leftward direction with respect to a right eye central line-of-sight (LOS) axis of said user is at least approximately 62°, and in a rightward direction with respect to said LOS axis is at least approximately 94°.

24. The user wearable optical display system according to claim 1, wherein said FOR afforded to a left eye of said user in a rightward direction with respect to a left eye central line-of-sight (LOS) axis of said user is at least approximately 62°, and in a leftward direction with respect to said LOS axis is at least approximately 94°.

25. The user wearable optical display system according to claim 1, wherein said user attachable section is selected from a list consisting of:
 glasses frame;
 sunglasses frame;
 strap;
 flexible strap;
 flexible adjustable strap;
 headband;
 headband incorporating apex crossing strap;
 double strap;
 strap incorporating chin strap;
 headband with wireframe helmet configuration;
 helmet;
 hat; and
 general head covering.

26. The user wearable optical display system according to claim 1, wherein said partially transmissive partially reflective lens is at least partly constructed from materials that allow said partially transmissive partially reflective lens to meet at least one of shatterproof and impact resistant standards.

27. An optical display system for presenting an image to a user, the optical display system comprising:
 a partially transmissive partially reflective lens, configured to be facing at least one eye of said user; and
 an electro-optical sub-system configured to have a fixed position with respect to said partially transmissive partially reflective lens, said electro-optical sub-system comprising:
  an image generator, configured to generate and irradiate light beams so as to form said image;
  a first lens;
  a second lens;
  a third lens;
  a fourth lens; and
  a curved mirror,
 wherein said image generator, said first lens, said second lens, said third lens, said fourth lens, and said curved mirror are in fixed positions with respect to each other, so as to allow said image to travel an optical path through said first lens, then through said second lens, then to reflect from said curved mirror and pass again through said second lens and through said first lens, then toward said third lens, then through said fourth lens, and then to reflect from said partially transmissive partially reflective lens toward said at least one eye of said user.

28. The optical display system according to claim 27, further comprising a planar mirror positioned between said image generator and said first lens, for reflecting said light beams along said optical path.

29. The optical display system according to claim 27, further comprising a planar mirror positioned between said third lens and said fourth lens, for reflecting said light beams along said optical path.

30. The optical display system according to claim 27, wherein said light beams are encoded with information that is exhibited in at least one domain that is selected from a list consisting of:
 spectral domain;
 spatial domain;
 temporal domain;
 light intensity domain; and
 polarization domain.

31. The optical display system according to claim 27, wherein said curved mirror is selected from a list of mirror types consisting of:
 a spherical mirror;
 an aspherical mirror;
 a hyberbolic mirror;
 an elliptical mirror;
 a parabolic mirror; and
 a toroidal mirror.

32. The optical display system according to claim 27, wherein a combination of optical elements that includes said first lens, said second lens, and said curved mirror is configured to correct for optical aberrations caused by a curved surface of said partially transmissive partially reflective lens.

33. The optical display system according to claim 32, wherein said optical aberrations include at least one of astigmatism and distortion.

34. The optical display system according to claim 27, wherein the combination of said first lens and said second lens increase the optical power of said image generator.

35. The optical display system according to claim 27, wherein said third lens forms an intermediate image that appears at an intermediate image plane located along said optical path between said third lens and said fourth lens.

36. The optical display system according to claim 27, wherein said partially transmissive partially reflective lens combines said light beams generated by said image generator and light incoming from a forward-facing environment with respect to said user.

37. The optical display system according to claim 27, wherein said partially transmissive partially reflective lens is a thin lens optically constructed to reduce optical distortion effects including prismatic deviation.

38. The optical display system according to claim 27, further comprising an electro-optical sub-system body that at least partially encloses and supports components of said electro-optical sub-system.

39. The optical display system according to claim 38, further comprising a user attachment section, coupled with said electro-optical sub-system body, for detachably mounting said optical display system to a head of said user.

40. The optical display system according to claim 39, wherein said electro-optical sub-system is configured to be positioned with respect to said user attachment section such that when said optical display system is mounted on said user, said electro-optical sub-system is located at a glabellar region of said user.

41. The optical display system according to claim 27, wherein said partially transmissive partially reflective lens is curved.

42. The optical display system according to claim 40, wherein positioning of said electro-optical sub-system body at said glabellar region provides a substantially unobstructed field of regard (FOR) to said user.

* * * * *